United States Patent
Fredricks et al.

(10) Patent No.: US 10,716,178 B2
(45) Date of Patent: *Jul. 14, 2020

(54) HABITAT CONTROL SYSTEM

(71) Applicant: Current USA, Inc., Vista, CA (US)

(72) Inventors: Dennis Fredricks, Escondido, CA (US); Jeffrey Eigenbrode, Encinitas, CA (US)

(73) Assignee: Current USA, Inc., Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/351,232

(22) Filed: Mar. 12, 2019

(65) Prior Publication Data
US 2020/0053850 A1    Feb. 13, 2020

Related U.S. Application Data

(63) Continuation of application No. 15/649,350, filed on Jul. 13, 2017, now Pat. No. 10,231,304, which is a
(Continued)

(51) Int. Cl.
*H05B 45/10* (2020.01)
*A01K 63/00* (2017.01)
(Continued)

(52) U.S. Cl.
CPC ........... *H05B 45/10* (2020.01); *A01K 63/006* (2013.01); *A01K 63/047* (2013.01); *A01K 63/06* (2013.01);
(Continued)

(58) Field of Classification Search
None
See application file for complete search history.

(56) References Cited

U.S. PATENT DOCUMENTS

| 3,121,417 A | 2/1964 | Goldman et al. |
| 3,535,513 A | 10/1970 | Cirami |

(Continued)

FOREIGN PATENT DOCUMENTS

| CN | 202197440 | 4/2012 |
| CN | 202697784 | 1/2013 |

(Continued)

OTHER PUBLICATIONS

Ashdown, Ian, Extended Parallel Pulse Code Modulation of LEDs, Proceedings of SPIE, the International Society for Optical Engineering (Jan. 1, 2006), SPIE, Bellingham, WA US.
(Continued)

*Primary Examiner* — Vibol Tan
(74) *Attorney, Agent, or Firm* — Insigne LLP

(57) ABSTRACT

The present invention consolidates and centrally organizes, among other things, the control of and communication with equipment and sensors placed in or adjacent to the habitat. In an embodiment of the invention, a system for controlling and recognizing habitat components comprises: a main controller comprising an integrated circuit (IC chip) containing information and programming for associated habitat components and a communication component for transferring updated programming and data to associated component via cable, WiFi, Bluetooth, or infrared; and a habitat component having an integrated circuit (IC) chip which contains operating data and acts as an identifier of the component, allowing an application on a smartphone or the main controller to automatically recognize the device and control programs.

10 Claims, 13 Drawing Sheets

Related U.S. Application Data continuation-in-part of application No. 14/624,464, filed on Feb. 17, 2015, now Pat. No. 10,455,667, which is a continuation-in-part of application No. 13/772,215, filed on Feb. 20, 2013, now Pat. No. 9,247,622.

(60) Provisional application No. 62/361,969, filed on Jul. 13, 2016.

(51) Int. Cl.
*A01K 63/04* (2006.01)
*G05B 15/02* (2006.01)
*A01K 63/06* (2006.01)
*G05D 7/06* (2006.01)
*H05B 45/20* (2020.01)
*H05B 47/16* (2020.01)
*H05B 47/19* (2020.01)

(52) U.S. Cl.
CPC ............ *G05B 15/02* (2013.01); *G05D 7/0676* (2013.01); *H05B 45/20* (2020.01); *H05B 47/16* (2020.01); *H05B 47/19* (2020.01)

(56) References Cited

U.S. PATENT DOCUMENTS

| | | | |
|---|---|---|---|
| 4,059,072 | A | 11/1977 | Vassallo et al. |
| 4,773,008 | A | 9/1988 | Schroeder et al. |
| 4,888,703 | A | 12/1989 | Baba et al. |
| 5,220,395 | A | 6/1993 | Yamashita et al. |
| 6,039,702 | A | 3/2000 | Cutler et al. |
| 6,292,901 | B1 | 9/2001 | Lys et al. |
| 6,375,630 | B1 | 4/2002 | Cutler et al. |
| 6,648,840 | B2 | 11/2003 | Cutler et al. |
| 6,748,898 | B2 | 6/2004 | Ulman et al. |
| 6,799,080 | B1 | 9/2004 | Hylden et al. |
| 6,805,074 | B2 | 10/2004 | Newcomb et al. |
| 7,222,047 | B2 | 5/2007 | McMillan et al. |
| 7,332,877 | B2 | 2/2008 | Crodian et al. |
| 7,352,339 | B2 | 4/2008 | Morgan et al. |
| 7,490,957 | B2 | 2/2009 | Leong et al. |
| 7,527,022 | B2 | 5/2009 | Bonner et al. |
| 7,724,082 | B2 | 5/2010 | Park et al. |
| D617,483 | S | 6/2010 | Fredricks |
| D617,484 | S | 6/2010 | Fredricks |
| D617,927 | S | 6/2010 | Fredricks |
| D617,928 | S | 6/2010 | Fredricks |
| 8,057,060 | B2 | 11/2011 | Fredricks |
| 8,100,087 | B2 | 1/2012 | Fredricks |
| 8,172,205 | B2 | 5/2012 | Bresolin et al. |
| 8,230,815 | B2 | 7/2012 | Fredricks |
| 8,502,480 | B1 | 8/2013 | Gerszberg et al. |
| 8,542,181 | B2 | 9/2013 | Smith et al. |
| 8,844,469 | B2 | 1/2014 | Fredricks |
| 8,646,934 | B2 | 2/2014 | Fredricks |
| 8,973,532 | B2 | 3/2015 | Fredricks |
| 9,166,811 | B2 | 10/2015 | Lawyer et al. |
| 9,247,622 | B2 | 1/2016 | Fredricks |
| 9,504,235 | B2 | 11/2016 | Tang et al. |
| 9,681,504 | B1 | 6/2017 | Barbosa |
| 9,839,206 | B2 | 12/2017 | Lawyer et al. |
| 10,231,304 | B2 | 3/2019 | Fredricks et al. |
| 10,342,189 | B2 * | 7/2019 | Gencer ............... A01K 63/042 |
| 2002/0111570 | A1 | 8/2002 | Cutler et al. |
| 2002/0115946 | A1 | 8/2002 | Cutler et al. |
| 2004/0123810 | A1 | 7/2004 | Lorton et al. |
| 2006/0212174 | A1 | 9/2006 | Garmon et al. |
| 2007/0106403 | A1 | 5/2007 | Emery et al. |
| 2007/0251461 | A1 | 11/2007 | Reichard et al. |
| 2007/0255431 | A1 | 11/2007 | Kinsey |
| 2007/0256643 | A1 | 11/2007 | Coiro et al. |
| 2007/0295277 | A1 | 12/2007 | Kin et al. |
| 2008/0147004 | A1 | 6/2008 | Mann et al. |
| 2008/0282988 | A1 | 11/2008 | Bloksberg |
| 2009/0003832 | A1 | 1/2009 | Pederson et al. |
| 2009/0085500 | A1 | 4/2009 | Zampini et al. |
| 2009/0200245 | A1 | 8/2009 | Steinbrueck et al. |
| 2009/0312853 | A1 | 12/2009 | Kore et al. |
| 2010/0033108 | A1 | 2/2010 | Mironichev |
| 2010/0084992 | A1 | 4/2010 | Valois et al. |
| 2010/0138007 | A1 | 6/2010 | Clark et al. |
| 2010/0327766 | A1 | 12/2010 | Recker et al. |
| 2011/0052416 | A1 | 3/2011 | Stiles |
| 2011/0126775 | A1 | 6/2011 | Seltzer et al. |
| 2011/0253056 | A1 | 10/2011 | Fredricks |
| 2011/0253057 | A1 | 10/2011 | Fredricks |
| 2011/0255266 | A1 | 10/2011 | Fredricks |
| 2011/0255267 | A1 | 10/2011 | Fredricks |
| 2012/0043889 | A1 | 2/2012 | Recker et al. |
| 2012/0062123 | A1 | 3/2012 | Jarrell et al. |
| 2012/0068615 | A1 | 3/2012 | Duong et al. |
| 2012/0074843 | A1 | 3/2012 | Recker et al. |
| 2012/0098432 | A1 | 4/2012 | Recker et al. |
| 2012/0098439 | A1 | 4/2012 | Recker et al. |
| 2012/0137983 | A1 | 6/2012 | Fredricks |
| 2012/0143381 | A1 | 6/2012 | Lawyer et al. |
| 2012/0262068 | A1 | 10/2012 | Chi et al. |
| 2012/0326610 | A1 | 12/2012 | Lawyer et al. |
| 2013/0038218 | A1 | 2/2013 | Xu et al. |
| 2013/0073103 | A1 | 3/2013 | Kao et al. |
| 2013/0186346 | A1 | 7/2013 | Milford et al. |
| 2013/0221859 | A1 | 8/2013 | Pavelchak |
| 2013/0239475 | A1 | 9/2013 | Crabb et al. |
| 2013/0293139 | A1 | 11/2013 | Sadwick |
| 2014/0011245 | A1 | 1/2014 | Flynn et al. |
| 2014/0209035 | A1 | 7/2014 | Tang et al. |
| 2014/0232294 | A1 | 8/2014 | Fredricks |
| 2015/0156995 | A9 | 6/2015 | Tang et al. |
| 2015/0163888 | A1 | 6/2015 | Fredricks |
| 2016/0242396 | A1 | 8/2016 | Fredricks |
| 2018/0132320 | A1 | 5/2018 | Fredricks et al. |
| 2018/0192621 | A1 * | 7/2018 | Valatka .................... A01K 1/00 |

FOREIGN PATENT DOCUMENTS

| | | |
|---|---|---|
| CN | 102917493 | 6/2013 |
| GB | 2470010 | 10/2010 |

OTHER PUBLICATIONS

Chin, Poh, Oon Siang Ling, Felix Cheang, Gilbert Tan, Light Emitting Diode (LED) Light Source as Energy Source for Aquarium Entire Ecosystem, IP.com Prior Art Database Technical Disclosure (Apr. 23, 2009) IP.com, Fairport, NY US.

Jongying, Jia, Wang Wei, The Intelligent System for LED Lighting Based on STCMCU, IEEE Conference Publications (2010), 445-447, IEEE, New York, NY US.

Hargrave, F., Hargrave's Communications Dictionary, (2001), 71-133, IEEE Press, New York, NY US.

Kathirvelan, J, R. Anilkumar, Alex Zachariah, A. Fazul, Development of Low Cost Automatic Wheelchair Controlled by Oral Commands Using Standalone Controlling System, 2012 IEEE International Conference on Computational Intelligence and Computing Research (Dec. 1, 2012), ICCIC 2012 IEEE Computer Society, Los Alamitos, CA US.

Kathirvelan, J., et al., Development of Low Cost Automatic Wheelchair Controlled by Oral Commands Using Standalone Controlling System, IEEE Conference Publications, (2012), 1-4, IEEE, New York, NY US.

Munoz, V.F., et al., Control Movement Scheme Based on Manipulability Concept for a Surgical Robot, IEEE Conference Publications (2006), 245-250, IEEE, New York, NY US.

Oldwai, U, M. Shakir, Ubiquitous Arabic Voice Control Device to Assist People With Disabilities, IEEE Conference Publications (2012), 333-338, IEEE, New York, NY US.

Oral Prog, ICCAS-SICE, IEEE Conference Publications (2009), IEEE, New York, NY US.

Sabev, L, Light Organ for Stereo Equipment, Funkschau (Mar. 12, 1976), 231-3, 48.6, DE.

(56) References Cited

OTHER PUBLICATIONS

Schmidt, E.H., C.D. Wright, J.S. Zwemer, Required Elements of Integrated Vehicle Control Systems, IEEE Conference Publications (1990), 463-471, IEEE, New York, NY US.
STIC search History, (9 pages) Jun. 26, 2017.
Unapproved IEEE Draft Guide for Health Informatics Point-of-Care Medical Device Communication Technical Report Guidelines for the Use of RF Wireless Technology, IEEE Standard (2007), P1073-00101/D02J, IEEE Standards Association, Piscataway, NJ, US.
Unapproved IEEE Draft Guide for Health Informatics Point-of-Care Medical Device Communication Technical Report Guidelines for the Use of RF Wireless Technology, IEEE Standard (2006), P1073.0.1.1/D01J, IEEE Standards Association, Piscataway, NJ, US.
Unapproved IEEE Draft Guide for Health Informatics Point-of-Care Medical Device Communication Technical Report Guidelines for the Use of RF Wireless Technology, IEEE Standard,(2008), P11073-00101/D5, IEEE Standards Association, Piscataway, NJ, US.
Unapproved IEEE Draft Guide for Health Informatics Point-of-Care Medical Device Communication Technical Report Guidelines for the Use of RF Wireless Technology, IEEE Standard,(2008), P11073-00101/D03, IEEE Standards Association, Piscataway, NJ, US.

* cited by examiner

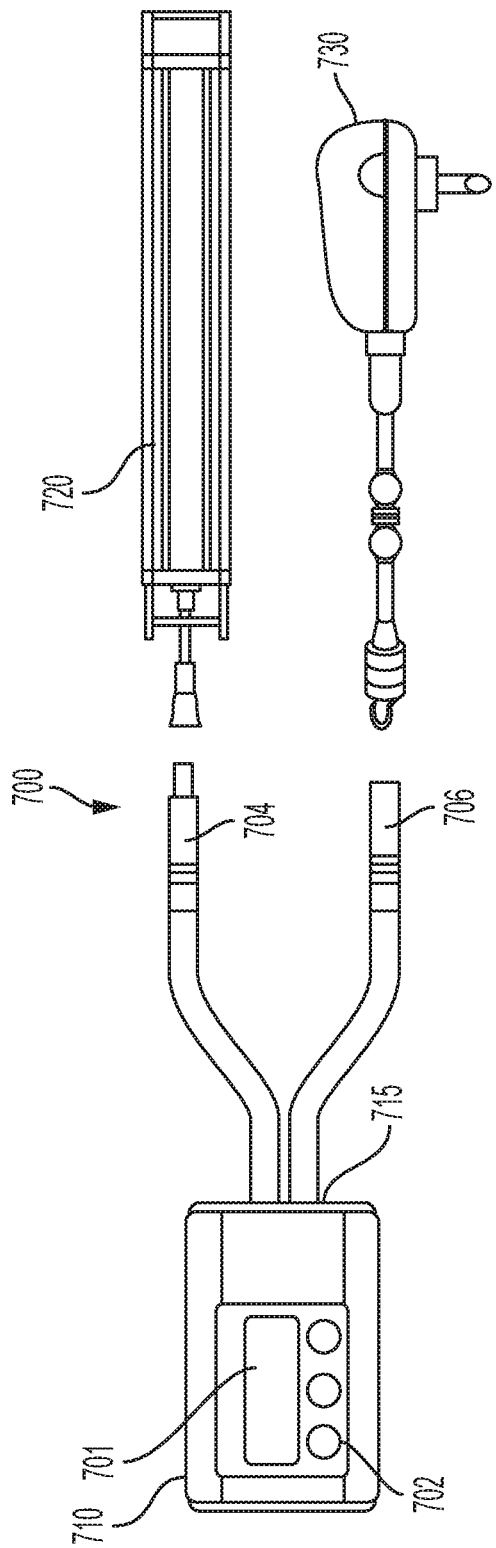
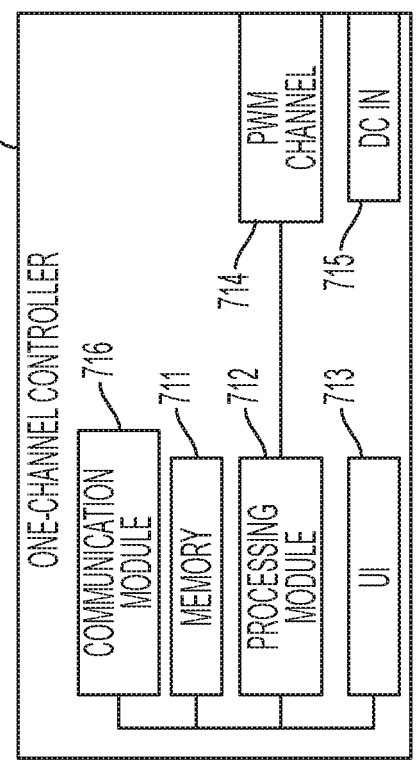
FIG. 7A
FIG. 7B

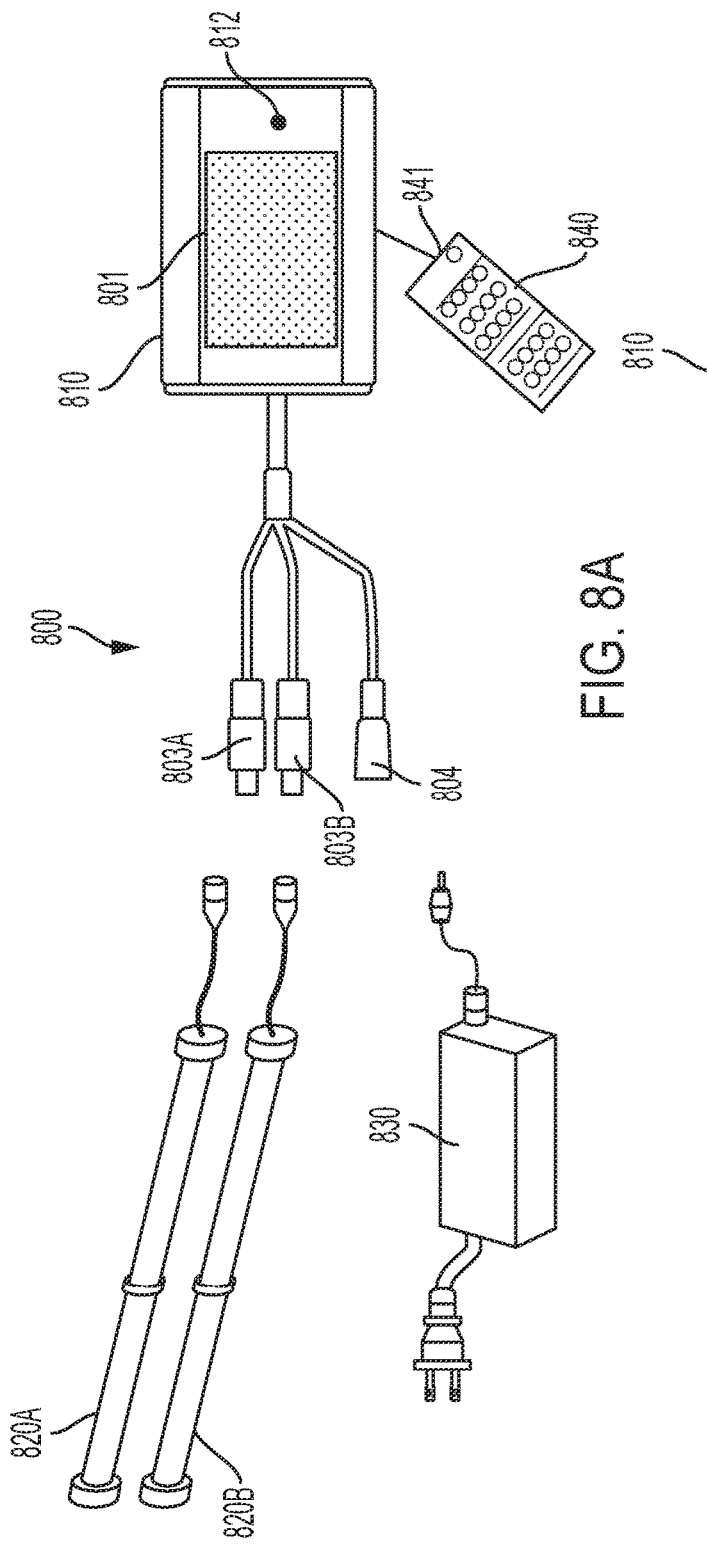
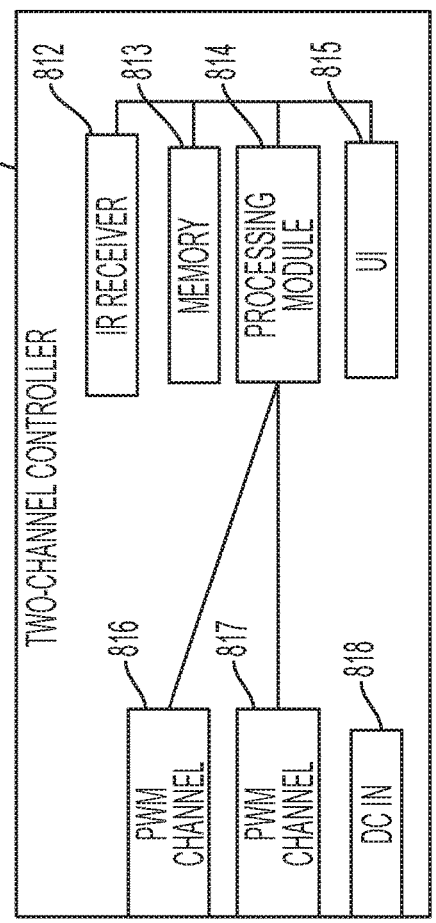
FIG. 8A
FIG. 8B

HABITAT CONTROL SYSTEM

CROSS-REFERENCE TO RELATED APPLICATIONS

The present application in a continuation of and claims priority to U.S. patent application Ser. No. 15/649,350 filed on Jul. 13, 2017 and entitled, "Habitat Control System," which claims priority to U.S. Provisional Patent Application No. 62/361,969, filed Jul. 13, 2016, and entitled "Habitat Control Systems;" and is also a continuation-in-part of U.S. patent application Ser. No. 14/624,464, filed Feb. 17, 2015, and entitled "Lighting Control Systems," which is a continuation-in-part application of U.S. patent application Ser. No. 13/772,215, filed Feb. 20, 2013, and entitled "Lighting Control Systems," the entire disclosures of which are incorporated by reference herein.

BACKGROUND OF THE INVENTION

1. Field of Invention

The present invention is directed to systems and methods for controlling an environment of a habitat provided by, for example, a vivarium.

2. Description of Related Art

A vivarium is an area, usually enclosed, for keeping and raising plants and/or and animals. Different forms of vivariums serve different purposes. For example, an aquarium simulates a submerged area of a water habitat for fish, plants, and other aquatic organisms. Aquariums can be customized in many ways and can be generally classified in one of five categories: freshwater, saltwater, brackish, reef, and planted. A freshwater aquarium imitates a pond or lake environment with clear, fresh water. A saltwater aquarium (or marine aquarium) simulates an ocean environment for fish that require a certain level of salinity in the water to survive. A marine aquarium can house a wider variety of fish and invertebrates including coral, but are more difficult to care for than a freshwater aquarium as the environment must be maintained more precisely for the health of the inhabitants. A brackish aquarium is a combination between saltwater and fresh, for fish that prefer some salinity in their water without a full marine environment. A reef aquarium is a marine environment designed specifically to suit the growth of coral. Different varieties of coral prefer different types of lighting. A planted aquarium can be freshwater, brackish, or marine in nature, but is focused on growing plants. A planted aquarium can also feature fish and other living creatures. Regardless of the type of aquarium, proper control of water filtration/circulation, water chemistry, temperature, and lighting, among other environmental variables, is required to create a lifelike and nourishing environment optimized for the growth of the inhabitants.

Other types of vivariums include, but are not limited to, a terrarium, a paludarium, and a riparium. A terrarium simulates a desert, savannah, woodland, or jungle habitat created by, for example, pebbles, leaflitter, and soil. By misting the terrarium, a natural water cycle occurs within the environment by condensation forming on the lid causing precipitation. A terrarium is often used to house reptiles, amphibians, spiders, scorpions, insects and small birds, as well as plants. A paludarium is a semi-aquatic enclosure simulating a rain forest, swamp, beach, or other wetland environment. In a paludarium, part of the habitat is under water and part is above water. A riparium is a planted aquarium that recreates a wet habitat found along the edges of lakes, rivers, ponds, and streams. As with an aquarium, proper control of water/air filtration/circulation, water/air chemistry, temperature, and lighting, among other environmental variables, is critical in supporting the inhabitants.

Aquascaping/terrascaping, is the craft of arranging natural objects such as plants, rocks, gravel, soil, cavework, and/or driftwood, and manmade objects such as artificial plants and decorations within a vivarium in an aesthetically pleasing manner. Various lighting fixtures, misters, water pumps, air pumps, wave machine, air/water filters, feeders, heaters, timers, and sound generators, among other types of vivarium equipment, can be implemented to emphasize the artful aquascaping/terrascaping, optimize the living environment for the vivarium inhabitants (e.g., photosynthesis), and mimic naturally occurring scenes, events, and cycles. Sensors such as, but not limited to, a thermometer or pH monitor, may be implemented to monitor important environmental conditions. Often, a simple vivarium employs several types of equipment and/or sensors, e.g., one or more lighting fixtures, a water filter, thermometer, and a heater. A complex vivarium may require numerous types of equipment and sensors, e.g., several lighting fixtures, a water filter, a heater, a mister, a fish feeder, a thermometer, a water pump, an air pump, and a pH monitor. To date, each type of vivarium equipment and sensor requires a separate controller, if one is even provided. Accordingly, a need exists to consolidate and synchronize the control of and communication with all vivarium equipment and sensors into a user friendly system and interface, thereby enabling, among other things, a truly "smart" vivarium experience.

SUMMARY OF THE INVENTION

The present invention overcomes these and other deficiencies of the prior art by providing a habitat control system that consolidates and centrally organizes, among other things, the control of and communication with equipment and sensors placed in or adjacent to a habitat.

In an embodiment of the invention, a system for controlling and recognizing habitat components comprises: a main controller comprising a processor configured to execute program instructions, memory storing a first set of program instructions as well as information associated with a set of habitat components, and a first manifold comprising a plurality of ports, wherein a first one of the plurality of ports is electrically coupled to a first habitat component from the set of habitat components, and a second one of the plurality of ports is electrically coupled to the main controller, wherein upon coupling of the first habit component to the first manifold, the processor of the main controller is configured to recognize an identity of the first habit component according to the information associated with the set of habitat components, and execute one or more program instructions from the first set of program instructions to control operation of the first habit component. The first manifold is a lighting manifold and the first habit component is an LED light. The system further comprises: a second manifold in communication with the main controller via the first manifold, wherein the second manifold comprises a plurality of ports, wherein one of the plurality of ports is electrically coupled to a second habitat component from the set of habitat components, wherein upon coupling of the second habit component to the second manifold, the processor of the main controller is configured to recognize an identity of the second habit component according to the information associated with the set of habitat components, and execute one or more program instructions from the first set of instructions to control an operation of the second habit component. The second manifold is a pump manifold and the second habit component is a pump. The second manifold is a device manifold and the second habit component is a sensor. The main controller further comprises a communications module for receiving communications from a remote controller or a user device, the communications comprising the first set of instructions or a second set of instructions, and the processor is configured to execute the second set of instructions to jointly control both the first habitat component and the second habit component. The main controller comprises a user interface and display. The user device is a smartphone, tablet, or personal computer. One of the plurality of ports in the first manifold or the second manifold is electrically coupled to a display, an audio speaker, or a communications module. The second habit component is selected from the group consisting of: an ornament, fish feeder, light, heater, chiller, water pump, air pump, wave maker, mister, fogger, thermometer, water monitor, air monitor, filter sensor, and water level sensor.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows:

FIG. 7A illustrates an example lighting control system implemented with a one-channel controller in accordance with an embodiment of the invention;

FIG. 7B illustrates a one-channel controller according to an embodiment of the invention;

FIG. 8A illustrates an example lighting control system implemented with a two-channel controller and IR remote in accordance with an embodiment of the invention;

FIG. 8B illustrates a two-channel controller according to an embodiment of the invention;

DETAILED DESCRIPTION OF EMBODIMENTS

Figure 1:
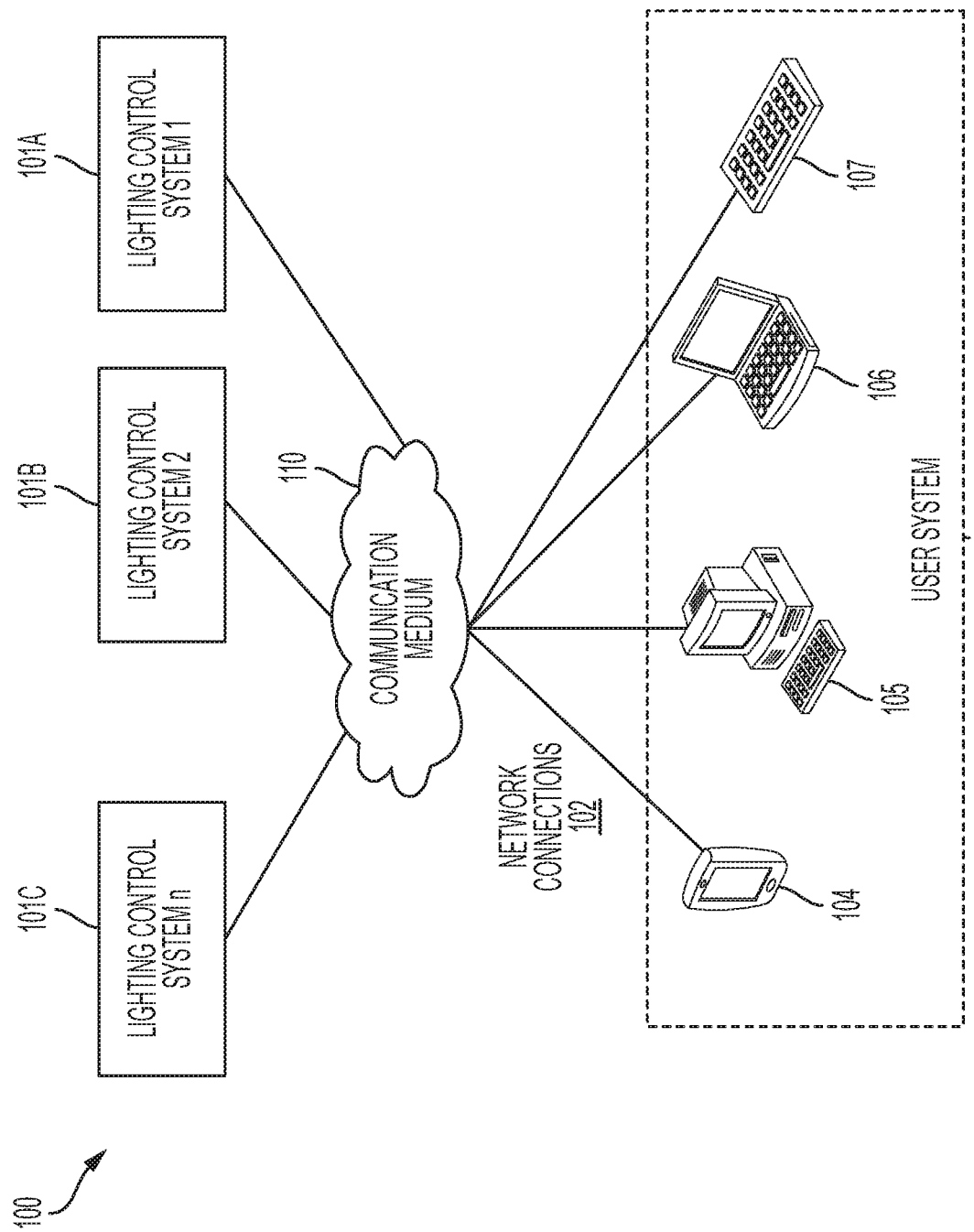
FIG. 1 illustrates a system for implementing one or more lighting control systems in accordance with one embodiment of the invention.

Preferred embodiments of the present invention and their advantages may be understood by referring to FIGS. 1-11B, wherein like reference numerals refer to like elements. Although the present invention is described from in the context of a vivarium, the present invention can be used with any type of habitat or any type of hydroponic, aquaponic, horticulture, plant and/or animal cultivation system including not only indoor systems, but those situated in an outdoor and natural setting. Alternatively, the present invention could be implemented as part of a purely decorative space where plants or animals are not present, e.g., a rock garden. The use of the term "habitat" is intended to cover simulated environments (e.g., greenhouse), manmade homes or environments (e.g., an aquarium), in addition to naturally occurring homes or environments (e.g., pond).

In general, the present invention consolidates and centrally organizes, among other things, the control of and communication with equipment and sensors placed in or adjacent to a habitat. The following disclosure provides many examples of equipment, particularly for an aquarium such as, but not limited to, lighting, heaters (and/or chillers), water/air pumps, wave makers, misters, and foggers. Moreover, the following disclosure provides many examples of sensors that can be utilized including, but not limited to thermometers and water/air quality monitors. Nonetheless, the scope of the present invention is not limited to the exemplary types of equipment and sensors provided herein. The present invention contemplates the implementation of any type of equipment and sensors, any combination thereof, whether currently available or developed in the future, which may assist in the control and maintenance of a habitat.

One of the principal components of any habitat is proper lighting. Duplicating natural lighting conditions greatly increases both survival and growth rates of plants and/or animals and creates a more realistic ecosystem. Light-emitting diode (LED) light fixtures are now very popular due to their small size, affordability, adaptability, energy efficiency, and controllability. Examples of LED light fixtures include Current USA's line of Satellite LED light fixtures, Orbit Marine LED light fixtures, and TrueLumen Pro LED light strips. Other types of light fixtures include, but are not limited to spotlights and lamps implementing incandescent, fluorescent, metal halide, or LED light sources. Collectively, these exemplary types of lighting equipment (as well as any other type of lighting equipment not disclosed) are referred to herein as "light fixtures."

FIG. 1 illustrates a system 100 for implementing one or more lighting control systems 101A-101C in accordance with one embodiment of the invention. In example environment 100, a user system 103 connects to one or more lighting control systems 101A-101C via a network connection 102 to communication medium 110. As shown, a user system 103 can comprise one more user devices such as, but not limited to a smartphone 104 (e.g., iPhone®), a desktop computer 105, a laptop computer 106, and a tablet 107 (e.g., iPad®), which communicates with one or more of lighting control systems 101A-101C over communication medium 110 to control one or more lighting fixtures (not shown) coupled to the lighting control systems. In this example system, multiple lighting control systems 101A-101C may operate seamlessly together. Each lighting control system 101A-101C is coupled to one or more light fixtures such as an LED via, for example, a power cable and communications cable. Each lighting control system 101 serves as a manifold for a number of light fixtures. Multiple lighting controls systems may be coupled together via electrical connectors for communications and power. In embodiments of the invention, only one lighting control system 101A is needed to control multiple lighting fixtures, as well as a number of other non-lighting equipment and sensors (not shown), which are addressed below.

The user systems 103 may also be coupled to additional communication mediums not in direct communication with the lighting control systems 101A-101C. For example, a user system 103 may communicate with a lighting control system 101A via WiFi while also being able to communicate with other Internet sources via a cellular network.

Communication medium 110 may comprise any communications network such as a local area network (LAN), a wireless LAN (WLAN), cellular or data network, a satellite network, an ad hoc network, an intranet, an extranet, a virtual private network (VPN), a wide area network (WAN), a personal area network (PAN), a portion of the Internet, a portion of the Public Switched Telephone Network (PSTN), or any combination thereof. These networks, the implementation of all of which are apparent to one of ordinary skill in the art, serve as examples and the identification of such is not intended to limit the invention in any manner. For example, the communications medium 110 may be a wireless network system such as, but not limited to a Bluetooth system or infrared system, or a wired network such as, but not limited to a coaxial cable system, a fiber optic cable system, an Ethernet cable system, or a USB system.

In various embodiments, a lighting control platform is hosted by one or more of the lighting control systems 101A-101C and made accessible to a user of a user system 103 (e.g., 104, 105, 106, and 107). In these embodiments, the user system 103 displays a graphical user interface (GUI) that allows a user to interact with the lighting control systems 101A-101C to control or adjust the light sources of the lighting fixtures. For example, the user system 103 may receive an instruction from a user via the GUI, transmit the instruction to one or more lighting control systems 101A-101C, and receive status updates from lighting control systems 101A-101C. The interface may implement different designs for different user systems 103. One of ordinary skill in the art will understand that various graphical user interfaces related to the lighting control (as well as other non-lighting equipment and sensors) may be created to facilitate the lighting control experience.

In one embodiment, a user may download a client component, e.g., a software application or "app," of a lighting control system from the Internet or the lighting control system itself (or from a lighting fixture) via memory contained therein. For example, a user may purchase a lighting control system or lighting fixture that comprises a client component, which is communicated to the user system 103. The client component is executed locally at a user system 103 while the lighting control system provides back-end support for the client component. In this embodiment, the light control system may maintain the lighting control data, process instructions from users, control one or more lighting fixtures, and transmit instructions and data to various user systems 103.

In a preferred embodiment of the invention, each lighting control system 101 and system component comprises an integrated circuit (IC). The term IC as used herein is also synonymous with a processor, microprocessor, or central processing unit (CPU). Each component within the overall systems disclosed herein may include an IC. For example, light fixtures and accessories such as, but not limited to ornaments, pumps, and fish feeders may comprises an IC, which allows the user system 103 or a lighting control system to automatically recognize it and associated programs. The IC acts as an identifier (when the device associated therewith is plugged into a lighting control system or "manifold" as referred below) and programming chip featuring specific lighting schemes (i.e., effect programs) such as, but not limited to color changing (e.g., lava in a volcano), flashing (volcano explosion), fading/flickering (simulate a fire or candle in a pagoda), or rotating colors (RGB in a jellyfish). The app on the user system 103 automatically recognizes these programs and allows the user to select and initiate these various programs.

Figure 2:
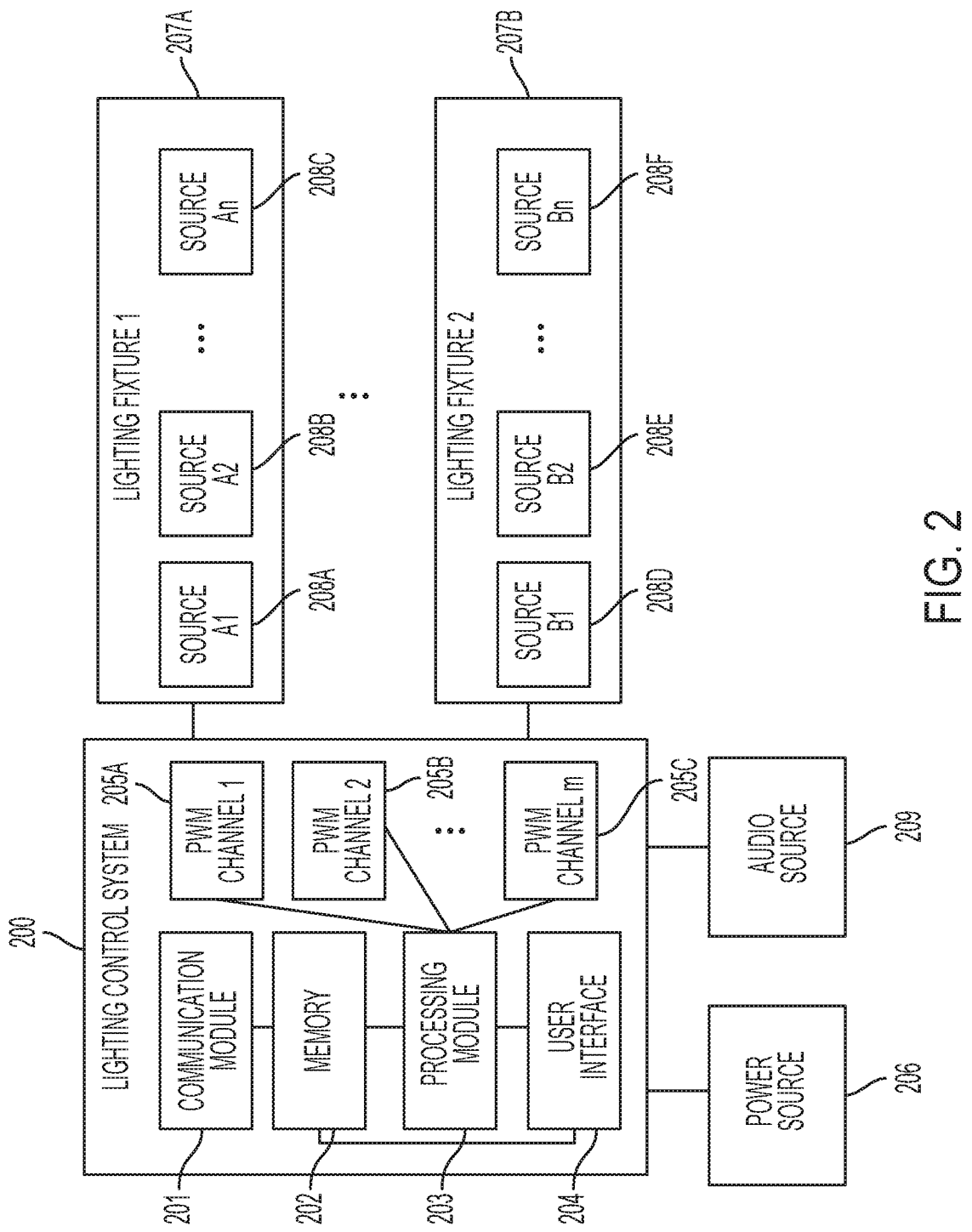
FIG. 2 illustrates an example lighting control system in accordance with an embodiment of the invention.

FIG. 2 illustrates an example lighting control system 200 in accordance with an embodiment of the invention. Lighting control system comprises a communication module 201, a memory 202, a processing module 203, a user interface 204, and a plurality of communication channels 205A-205C. In an exemplary embodiment of the invention, the communication channels 205A-205C are pulse width modulation (PWM) channels. However, other types of digital signals may be used for communication channels 205A-205C such as, but not limited to binary code modulation (BCM) channels. For simplicity, the present invention will be further described only in the context of PWM channels—nonetheless, other types of channels may be implemented.

As illustrated, memory 202 is coupled to communication module 201 and processing module 203. The memory 202 may be a non-volatile memory such as EEPROM/PROM(s) that retains the stored information when not powered. Accordingly, boot programs and basic input/output system (BIOS) programs are stored in the memory 202. In various embodiments, different components or modules of the lighting control system are mounted on one or more printed circuit boards (PCB). In some embodiments, the lighting control system and different lighting fixtures 207A-207B may be mounted on the same PCB.

Lighting control system 200 is connected between a power source 206 and one or more lighting fixtures 207A-207B. The power source 206 may be a power adapter that converts alternating current (AC) from a power outlet into a 12-volt or 24-volt direct current (DC). Alternatively, the power source 206 may comprise one or more batteries. In one embodiment, when one or more lighting fixtures 207A-207B are constant-voltage supplied, the lighting control system 200 adjusts the current supplied to them by adjusting the duty cycles of the corresponding PWM channels 205A-205C. In further embodiments, each light source 208A-208F of the lighting fixtures may have a corresponding PWM channel.

The lighting fixtures 207A-207B comprise light sources 208A-208F. Each or some combination of the light sources may be associated with a PWM channel of the lighting control system 200, which adjusts the duty cycle of each PWM channel to control/vary the intensity and wavelength (or wavelength band) of the corresponding one or more light sources as a function of time. For example, in one embodiment the lighting fixtures 207A-207B may be configured with a series of identically colored light sources that allow for variable light intensity. In another embodiment, the lighting fixtures may be configured with a series of red, green, and blue (RGB) light sources that allow for different color blends. In yet another embodiment, the lighting fixtures may be configured with a series of red, green, blue, and white (RGBW) light sources that allow for different color blends. In the RGB and RGBW light source embodiments, the duty cycle adjustments of the PWM channels may be used to create different combinations of colors, wavelength spectrums, timing patterns, and programmed effects (e.g., thunderstorms, which are described in more detail below).

The communication module 201 is configured to receive instructions from or transmit instructions to various user systems. In one embodiment, the communication module 201 comprises a network interface controller that connects the lighting control system 200 with a wired (e.g., coaxial, fiber optic, Ethernet, USB) or wireless (e.g., WPAN, WLAN, cellular, Bluetooth, Wi-Fi) communication system. The processing module 203 is configured to process any received user's instructions, which may be stored in the memory 202. When processing the instructions, the processing module 203 generates PWM channel control signals and accordingly adjusts the duty cycles of the PWM channels 205A-205C to create desired lighting effects. In some embodiments, the processing module 203 only adjusts the PWM channels that have connected lighting sources. In these embodiments, the PWM channels that have no connected lighting sources will not be adjusted and will generate NULL output.

The user interface 204 may comprise an internal display (not shown) such as a touchscreen and optional user input buttons. Alternatively, the user interface 204 comprises software that is downloaded to a user system 103. Via the user interface 204, a user may program instructions (or select preprogrammed instructions) for how the lighting fixtures 207A-207B should be adjusted. For example, a user may choose a color or color blend that enhances the color of a fish species, a color that reflects a mood, and/or a location where a light source should be adjusted and how it should be adjusted. As another example, a user may select other lighting characteristics and effects such as a color combination, a dimming option, or a photoperiod. In one embodiment, the lighting control system 200 is preloaded with profiles of a selection of lighting characteristics and effects such as commonly used lightings. These preloaded profiles may be displayed on the user interface 204 for user selection.

The user interface 204 of lighting control system 200 may be a graphical user interface (GUI), a web-based user interface (WUI), a touchscreen, a touch user interface, or other user interfaces through which a user may interact with the lighting control system 200. In one embodiment, the lighting control system 200 comprises a one-touch button that allows a user to program lighting control instructions or commands. In another embodiment, the lighting control system 200 comprises a remote controller that allows a user to program lighting control instructions or commands. The remote control may communicate via one or more wireless communication protocols such as Bluetooth, Zigbee, 802.11 protocols, Infrared (IR), Radio Frequency (RF), etc.

In one embodiment, the lighting control system 200 comprises an internal calendar and/or an internal clock, or receives a time and date from the user system 103 or a network source via the communications medium 110. As such, the lighting control system 200 may adjust the light sources according to date and time specified in the user's instructions. In one implementation of this embodiment, a user may select how the lighting source should be turned on or turned off, including the ramp-up time and intensity (e.g., fading in), and the ramp-down time and intensity (e.g., fading out).

In another embodiment, the lighting control system 200 may include a global positioning system (GPS) receiver to determine its location or may receive location information from the user system 103 or a network source via the communications medium 110. Location information can be used to adjust the light sources to mimic naturally occurring lighting events (e.g., sunrises, sunsets, and eclipses) at that location at a certain time. Alternatively, the user may select any location worldwide to mimic naturally occurring lighting events at that respective location.

In one embodiment, a sunrise/sunset effect may be simulated by varying the intensity and colors of the light sources during different times of the day. For example, the intensity of the light sources 208A-208F of light fixtures 207A-207B may gradually ramp up from zero percent (0%) just before sunrise to one hundred percent (100%) around noon, and gradually ramp down back to zero percent (0%) after sunset. In one specific implementation of this embodiment, the sunrise/sunset effect is simulated by ramping up a blue light intensity in the morning and ramping down the blue light intensity in the evening. In another embodiment, the lighting control system 200 can adjust light sources 208A-208F of light fixtures 207A-207B to mimic the actual light intensity and spectrum striking the earth at any particular time and/or location around the world. For example, a user could select a time and location on earth and the lighting control system 200 would adjust the light sources 208A-208F to mimic the light striking that location at that time.

In another embodiment, a cloud cover effect may be simulated. In this embodiment, a simulation of clouds passing by the sun may be created by varying the speed at which selected light sources 208A-208F of the light fixtures 207A-207B dim and brighten different areas of the aquarium. Faster moving clouds may be simulated by selecting a shorter intensity variation period for a light source. In yet another embodiment, a thunderstorm effect may be simulated by flashing certain select light sources 208A-208F while dimming the other sources.

In one embodiment, the lighting control system 200 may include a weather receiver to identify the local weather (or weather at a remote location) via the user system 103 or a network source via the communications medium 110. Weather information may be used to adjust the light sources to mimic weather events simultaneously occurring at the respective location (e.g., thunderstorms, cloud cover, etc.). A location naturally associated with the inhabitants of the habitat can be selected in order to mimic the native environment/weather that those inhabitants would find in their natural surroundings. For example, the weather of a vivarium comprising chardonnay grapes could be replicated to that found in Eastern France at any particular time or season in the past. In another embodiment, historical weather patterns based on certain location and a historical time on earth could be replicated for studying, for example, extinct or nearly extinct animal, e.g., American honey bees, and/or plant species, e.g., wild American ginseng.

In another embodiment, the lighting control system 200 acts as a slave device under control of a master user system 103 or a master network source in a master-slave relationship via a communications medium. For example, all primary processing is performed at the user system 103 or the network source and the lighting control system merely converts instructions received from the user system 103 or the network source into lighting control commands for the respective lighting fixtures.

In yet another embodiment of the invention, the lighting control system 200 may be coupled to an audio speaker 209 via an audio jack or Bluetooth channel. The lighting control system 200 regulates light supplied to the lighting fixtures 207A-B and sound signals to the audio speaker 209 in coordination. A user may select a sensitivity setting and the lighting control system 200 may adjust the light based on the selected sensitivity setting (for example, low, medium or loud volumes.) For example, the lighting fixtures 207A-B may flash (to mimic lightning) to the sounds (to mimic thunder) from the audio source 209

Figure 3:
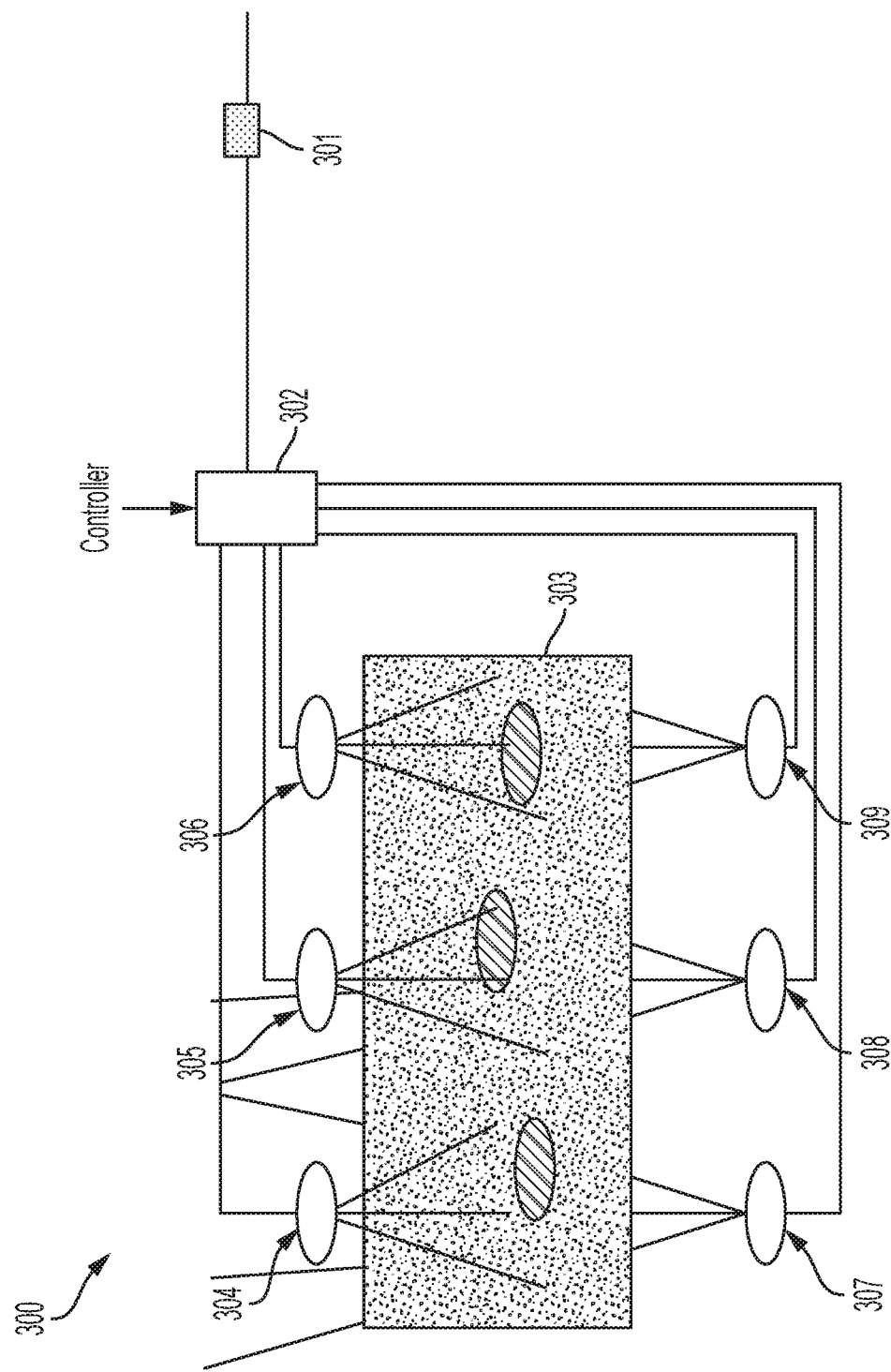
FIG. 3 illustrates an example implementation of a lighting control system in accordance with an embodiment of the invention.

FIG. 3 illustrates an example implementation 300 of a lighting control system 302 in accordance with an embodiment of the invention. The illustrated implementation 300 comprises a transformer 301, lighting control system 302, an aquarium 303, and lighting fixtures 304-309 comprising one or more light sources. The lighting fixtures 304-309 may be the same or may be different. As illustrated, the lighting control system 302 controls multiple lighting fixtures to create various lighting effects. For example, the lighting control system 302 may control the lighting fixtures 304-306 above the aquarium 303 to fade one by one from left to right.

Figure 4C:
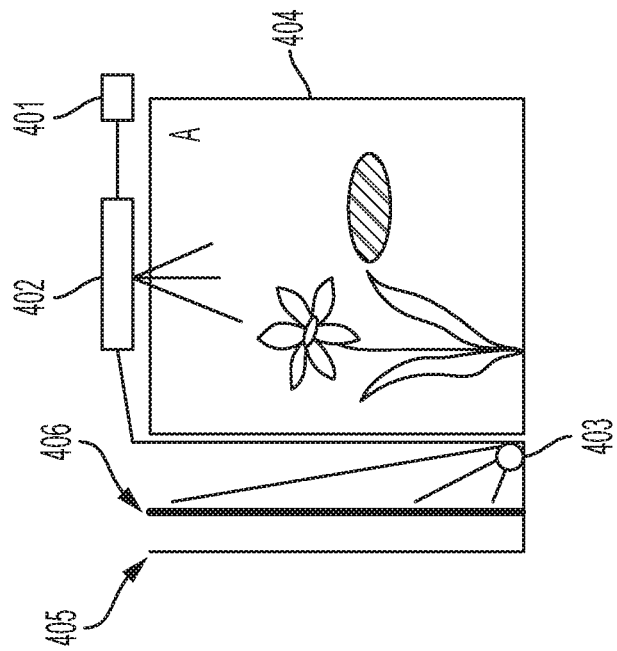
FIG. 4C illustrates a lighting control system with an accessory light outside an aquarium according to an embodiment of the invention.
Figure 4B:
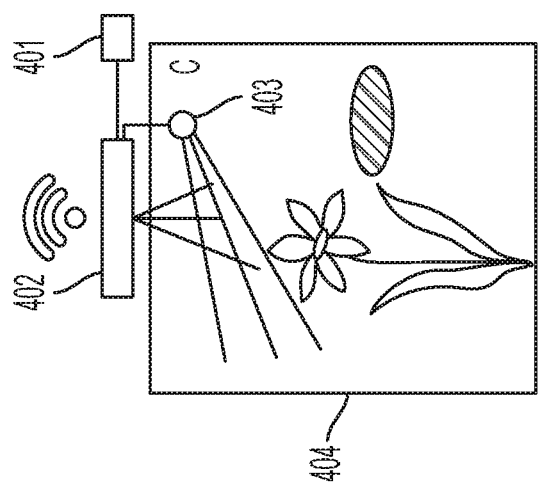
FIG. 4B illustrates a lighting control system with an accessory light above the water according to an embodiment of the invention.
Figure 4A:
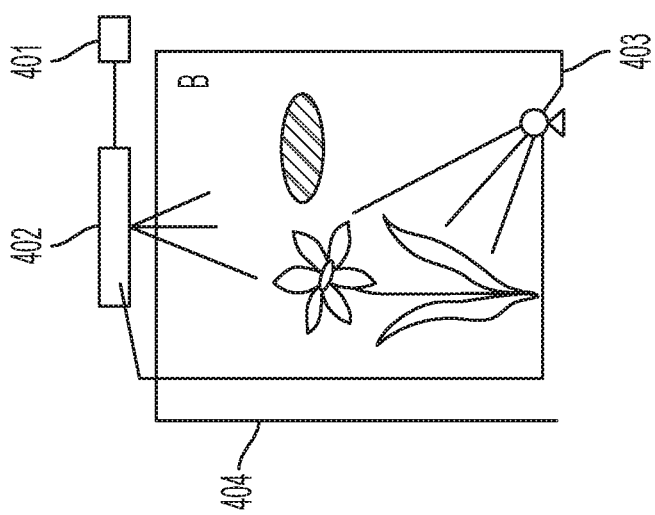
FIG. 4A illustrates a lighting control system with a submersible accessory light according to an embodiment of the invention.

FIGS. 4A-4C illustrate exemplary implementations of a lighting control system 401 in accordance with an embodiment of the invention. As illustrated, the lighting control system 401 is coupled to a lighting fixture 402. The lighting fixture 402 comprises an accessory light 403 that is coupled to the lighting fixture 402 via a cable. The accessory light 403 may be a lighting fixture such as a light strip or a spotlight. The lighting fixture 402 and the accessory light 403 may each comprise a set of light sources. In these exemplary implementations, the lighting control system 401 may synchronously control both the lighting fixture 402 and the accessory light 403 according to a user's instruction. The lighting control system 401 may control the lighting fixture 402 and the accessory light 403 such that the lighting fixture 402 and the accessory light 403 work in concert with each other. For example, the accessory light 403 may be complementary to the lighting fixture 402.

In an optional embodiment of the invention, the lighting control system 401 is coupled to a sensor such as, but not limited to a thermometer (not shown). Upon the sensor sensing a predetermined threshold (such as a maximum temperature limit detected via a thermometer), the lighting control system 401 decreases/increases the intensity (or turns on/of) the lighting fixture 402 and/or the accessory light 403. For example, the lighting control system 401 may decrease the intensity of the lighting fixture 402 and/or the accessory light 403 when a maximum temperature is sensed via the sensor. Alternatively, the lighting control system 401 may change the wavelength of the lighting fixture 402 and/or the accessory light 403 when a threshold is detected via the sensor.

As illustrated by FIG. 4A, accessory light 403 is submersible in a vivarium such as a fish tank 404 and may function as landscape lighting. Additionally, as illustrated by FIG. 4B, accessory light 403 may be placed above the water in the aquarium 404. Furthermore, as illustrated by FIG. 4C, accessory light 403 may be place outside the aquarium 404. In this example, a removable background insert 406 is placed into a slot (not shown) between the wall 405 and the aquarium 404. The placement of the background insert 406 and accessory light 403 in this example may be used to create a theme, for example, beaches, forests, flowers, etc. The accessory light 403 may shine on the background insert 406 or on the wall 405 when the background insert 406 is removed.

Figure 5A:
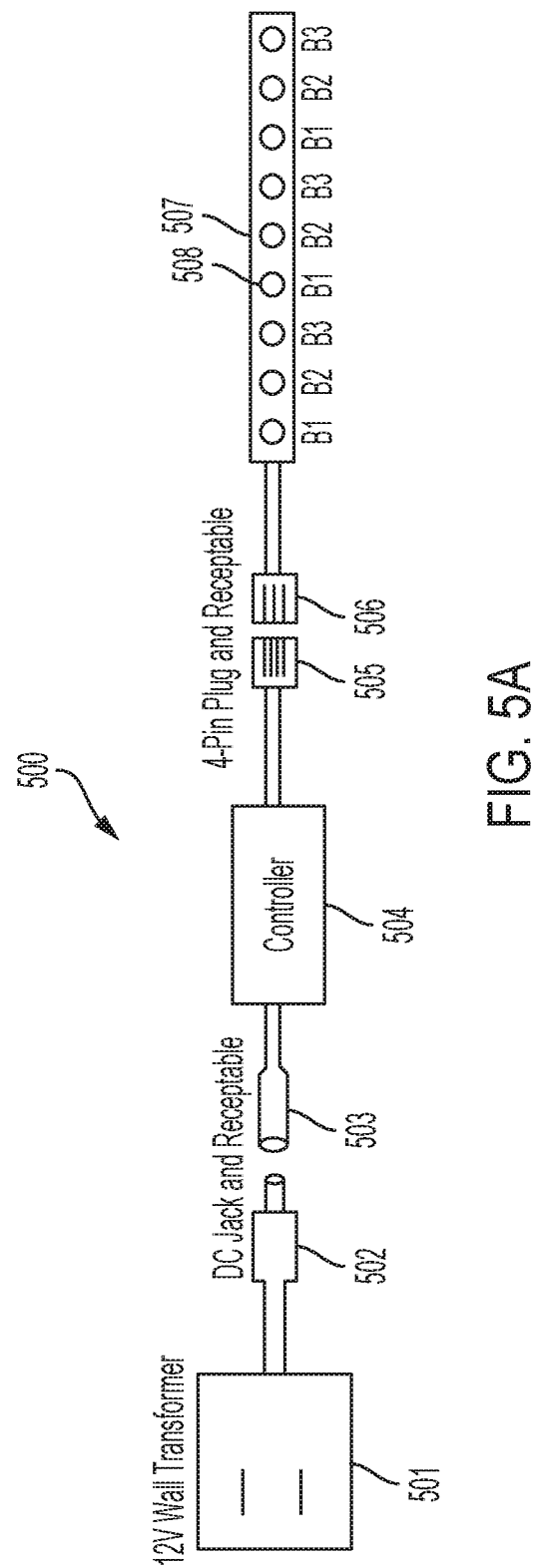
FIG. 5A illustrates a lighting control system in accordance with an embodiment of the invention.

FIG. 5A illustrates a lighting control system 504 in accordance with another embodiment of the invention. The lighting control system 504 is implemented in a lighting system 500, which comprises a 12-volt wall transformer 501, and lighting fixture 507 comprising light sources 508. The lighting fixture 507 may be configured with a series of identically colored light sources (e.g., blue LEDs) that allow for variable light intensity, or a series of RGB light sources that allow for different color patterns. In the lighting system 500, the lighting fixture 507 is configured as a flexible LED strip.

The lighting control system 504 may be used in some embodiments to control the behavior and parameters of the light sources 508 within the lighting fixture 507. For example, the lighting control system 504 may control the color pattern, light intensity, or timing of light patterns emitted from the lighting fixture 507. Additionally, the lighting control system 504 may be configured with a stop switch (not shown), which when engaged would cause the lighting control system 504 to stop or pause the logic the lighting control system 504 is performing through the lighting fixture 507.

Some embodiments are implemented with plug-in connectors that allow for easy removal and replacement of light fixtures. For example, in the lighting system 500, the system is configured with a direct current (DC) jack 502 and DC receptacle 503, allowing the wall transformer 501 to be easily disconnected from the lighting control system 504 without the need for tools. Further, the lighting control system 504 may be configured with a 4-pin plug 505 and receptacle 506, which allows the lighting control system 504 and/or the lighting fixture 507 to be easily connected or disconnected. In further implementations of these embodiments, controller 504 may be implemented.

Figure 5B:
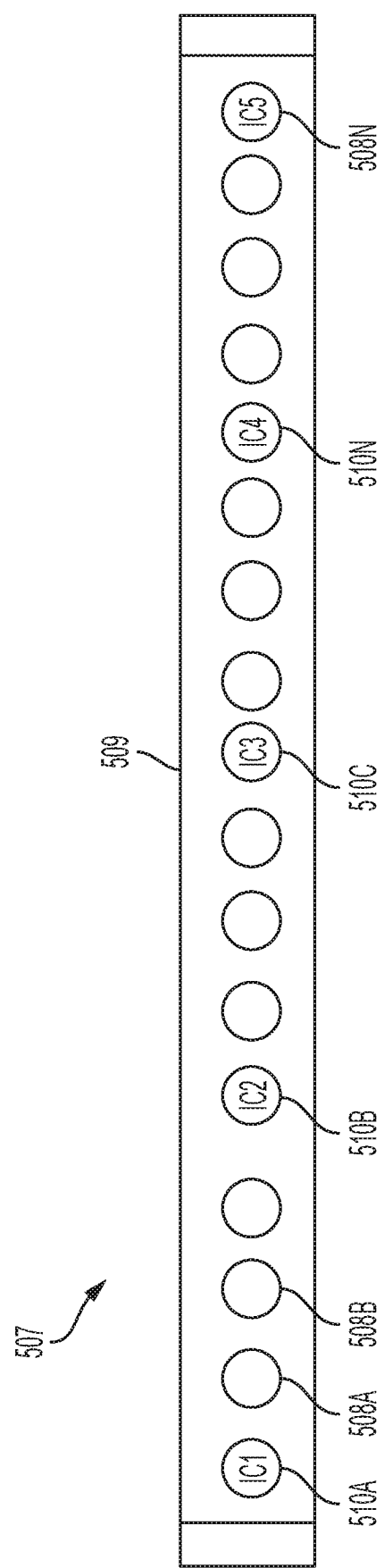
FIG. 5B illustrates a lighting fixture comprising a multiple integrated circuit (IC) LED strip according to an embodiment of the invention.

FIG. 5B illustrates a lighting fixture 507 comprising a multiple integrated circuit (IC) LED strip 509 according to an embodiment of the invention. Here, the LED strip 509 comprises a number of ICs 510A-N, which are individually controlled, providing the ability to simulate light movement across light sources 508A-N such as rolling horizontal clouds. The light sources 508A-N may each comprise a focusing lens or adjustable lens to adjust beams of light. In an embodiment of the invention, each IC 510 is associated with a red light source 508, a green light source 508, and a blue light source 508, which are used are used to accent colors in fish, plants, or corals and provide the proper lighting spectrum for growth of such. The light sources 508A-N can be adjusted via PWM signals for intensity and/or brightness as a function of time and may work in conjunction with other habitat equipment such as, but not limited to pumps, foggers, misters, and wave generators to simulate weather effects.

Figure 6:
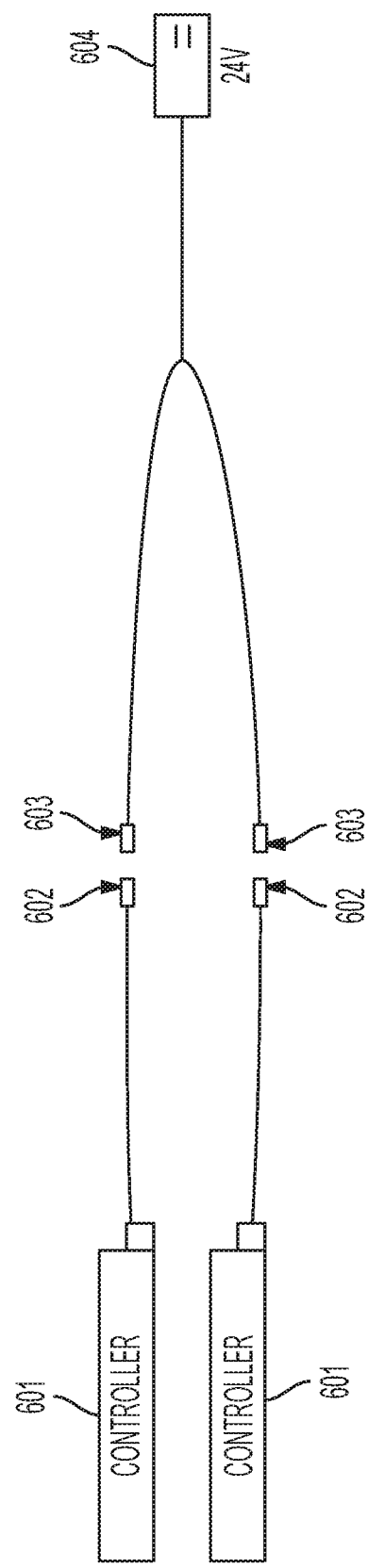
FIG. 6 illustrates multiple lighting control systems implemented together according to an embodiment of the invention.

In certain embodiments of the disclosure, the lighting control system may be further configured with male and/or female power connectors that allow multiple modular lighting control systems (e.g., any of those disclosed herein) to be implemented together, either in parallel or in series. As illustrated in FIG. 6, each lighting control system 601 is configured with a female DC receptacle 602, which can accept a male plug from a power supply unit 604. As such, two or more lighting control systems 601 may be connected to a single power supply unit 604 by using a splitter with male DC plugs 603.

FIGS. 7A-7B illustrates an example lighting control system 700 implemented with a one-channel controller 710 in accordance with an embodiment of the invention. As illustrated, lighting control system 700 includes one-channel controller 710, lighting fixture 720, and transformer 730. In this embodiment, transformer 730 provides DC power to one channel controller 710 through DC IN port 715 by electrically and removably coupling to female DC plug 706. In one embodiment, transformer 730 may directly plug in to DC IN port 715.

One-channel controller 720 comprises communication module 716, memory 711, processing module 712, user interface (UI) 713 with display 701 and touch buttons 702, and PWM channel 714. In this particular embodiment, controller 720 is configured as a one-channel DC timer that electrically and removably coupled to lighting fixture 720 via male jack 704 to provide a time-varying current to lighting fixture 720. More particularly, one-channel controller includes a processing module 712 configured to adjust the duty cycles of PWM channel 714, thereby controlling the intensity of the light sources of light fixture 720.

As illustrated, UI 713 is implemented via a display 701 and tactile buttons 702 via which a user may program instructions for one-channel controller 710 to vary the light intensity (e.g., percentage intensity at particular day, hour, and minute) provided to lighting fixture 720. For example, a user may program ramp up/down lighting intensity times to emulate a sunrise/sunset effect in an aquarium including lighting fixture 720. For example, the intensity of the light sources of light fixture 720 may gradually ramp up from 0% just before sunrise to 100% around noon or midday, and gradually ramp down back to 0% after sunset.

Memory 711 may be a non-volatile memory that is used to store user created or predefined lighting modes that specify timing instructions for one-channel 710. In one embodiment, a user may cycle through these lighting modes by pressing a one touch button 702.

In some embodiments, lighting control system 700 may be implemented with a plurality of one-channel controllers 710, each coupled to a corresponding lighting fixture 720. For example, a DC splitter may be used to couple a plurality of one-channel controllers to transformer 730. In additional embodiments, one-channel controller 710 may be used to a synchronously power a plurality of lighting fixtures 720 by plugging male jack 704 into a male jack splitter.

FIGS. 8A-8B illustrate an example lighting control system 800 implemented with a two-channel controller 810 and IR remote 840 in accordance with an embodiment of the invention. As illustrated, lighting control system 800 includes two channel controller 810, lighting fixtures 820A-820B, transformer 830, and IR remote 840. Transformer 840 provides DC power to two-channel controller 810 through DC IN port 818 by electrically and removably coupling to female DC plug 804. In one embodiment, transformer 830 may directly plug into DC IN port 818.

Two-channel controller 810 comprises IR receiver 812, memory 813, processing module 814, UI 815 with display 801, and PWM channels 816-817. In this particular embodiment, controller 810 is configured as a two-channel DC timer that electrically and removably couples to lighting fixture 820A-820B via respective male jacks 803A-803B to provide separate time-varying currents to lighting fixtures 820A-820B. More particularly, two-channel controller includes a processing module 814 configured to adjust the duty cycles of PWM channels 816 and 817, thereby separately controlling the intensity of light sources attached to light fixtures 820A and 820B.

In this particular embodiment, two-channel controller 810 includes an IR receiver configured to receive user-programmed instructions sent by IR remote 840 via IR transmitter 841. These user-programmed instructions are delivered by IR transmitter 841 in pulses of infrared light that represent binary codes of information. The received information may then be processed by processing module 814 for controlling the duty cycles of PWM channels 816 and 817, and storing settings in memory.

For example, a user may use IR remote 840 to respectively program the time-varying light intensity (e.g., percentage intensity at particular day, hour, and minute) of lighting fixtures 820A and 820B. In one embodiment, IR remote comprises a plurality of one-touch buttons that allow a user to power on/off controller 810, select preprogrammed or user-created lighting modes, adjust the lighting intensity of fixtures 820A-820B, store programmed lighting modes into memory 813, etc. In one example implementation of this embodiment, various one-touch buttons may each correspond to a respective lighting mode stored in memory.

In this embodiment, UI 815 provides a display 801 via which a user may observe in a user-readable form the instructions transmitted by IR remote 840. In implementations of this embodiment, display 801 may be a touch interface that allows a user to enter instructions without the use of IR remote 840.

In one embodiment, two-channel controller 810 may be used with lighting fixtures 820A-820B to simulate a sunrise/sunset effect using one lighting fixture in an aquarium and a moonlight effect using the other lighting fixture in the aquarium. For example, one lighting fixture may comprise white lighting sources for simulating the sunrise/sunset effect in the morning/evening, and the other lighting fixture may comprise blue lighting sources for simulating the moon effect at night. A user may separately program ramp up/down lighting intensity times for each lighting fixture to simulate these effects in the aquarium.

In some embodiments, lighting control system 800 may be implemented with a plurality of two-channel controllers 810, each coupled to a corresponding two lighting fixtures 820A-820B. For example, a DC splitter may be used to couple a plurality of two-channel controllers to transformer 830. In additional embodiments, two channel controller 810 may be used to synchronously power additional lighting fixtures by plugging male jacks 803A and/or 803B into male jack splitters.

Figure 9:
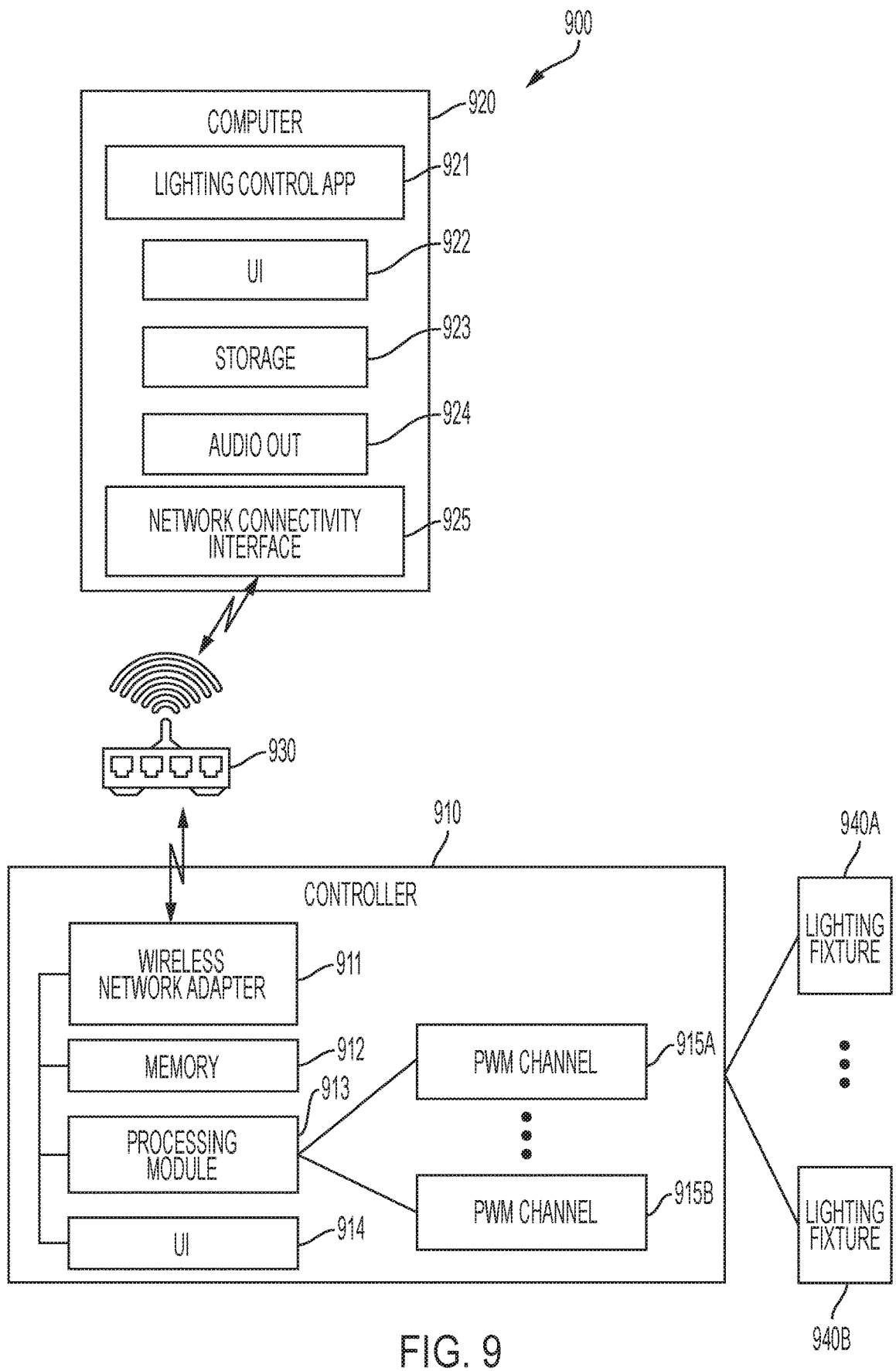
FIG. 9 illustrates an example lighting control system implemented m a Wi-Fi network in accordance with an embodiment of the invention.

FIG. 9 illustrates an example lighting control system 900 implemented m a Wi-Fi network in accordance with an embodiment of the invention. In this embodiment, a computer 920 with installed lighting control application 921 may deliver user lighting instructions (i.e., lighting control information) to controller 910 using wireless access point 930 (e.g., router). Additionally, computer 920 may wirelessly receive lighting control information from controller 910 (e.g., the current settings stored in controller memory 912) via wireless access point 930. These embodiments may be implemented in Wi-Fi networks that do not necessarily provide access to the Internet (e.g., a LAN).

Computer 920 may comprise any computing device (e.g., smartphone, tablet, laptop, laptop-tablet hybrid, workstation, or a combination thereof) configured to connect to wireless access point 930 to deliver lighting control information to lighting controller 910. As illustrated, computer 920 comprises user interface (UI) 922, lighting control application 921, storage 923, audio output 924, and network connectivity interface 925 for connecting to the Wi-Fi network at wireless access point 930. A user of computer 920 may interact with lighting control application 921 via UI 922 to set lighting control information, store that information in storage 923, and wirelessly deliver that information to controller 910 via wireless access point 930. In an alternative embodiment, wireless access point 930 is omitted and the computer 920 communicates directly with the lighting controller 910 via Wi-Fi.

Controller 910 comprises wireless network adapter 911, memory 912, processing module 913, UI 914, and a plurality of PWM channels 915A-915B configured to drive a plurality of corresponding lighting fixtures 940A-940B. The wireless network adapter 911 may be built into controller 910 or installed via a port such as a USB interface. As illustrated, wireless network adapter 911 allows controller 910 to connect to the Wi-Fi network over wireless access point 930 and receive lighting control information from computer 920. In additional embodiments, controller 910 may deliver lighting control information (e.g., current settings stored in memory 912) to computer 920 over the wireless network.

In embodiments, multiple lighting controllers 910 may be configured in system 900 with male and/or female power connectors that allow the multiple lighting controllers 910 to be connected together, either in parallel or in series. For example, each lighting controller 910 may be configured with only a female DC receptacle, which can accept a male plug from a power supply unit. As such, two or more lighting controllers 910 may be connected to a single power supply unit by using a splitter with male DC plugs. In implementations of these embodiments, each of the multiple lighting controllers 910 may share lighting control information either via direct wireless network communication, through physical links, or by communicating with computer 920.

In various embodiments, lighting control application 921 may be executed by one or more processors of computer 920 (not shown) to provide a user interface whereby a user may set lighting control information, view lighting control information, and otherwise transmit and/or receive lighting control information from one or more controllers 910.

In one embodiment, lighting control application 921 comprises various lighting effect modules (e.g., sunrise/sunset module, moonlight module, thunderstorm module, color selection module, timer module, etc.) that allow a user to select one or more lighting effects for a corresponding one or more PWM channels 915A-915B of controller 910. The selection of these lighting effects may be based on the lighting fixtures 940A-B used in the user's aquarium, the light sources used in the lighting fixtures 940A-B, the number of PWM channels 915A-915B in the controller 910, the capabilities of the controller, etc. In additional embodiments, lighting control application 921 may allow a user to simulate the lighting effects in the application itself by creating and displaying on a display of computer 920 a virtual environment that includes a vivarium and the lighting fixtures positioned in the actual configuration of the vivarium and lighting fixtures 940A-B.

In a further embodiment, lighting control application 921 includes an audio module configured to play sound effects and music through audio output 924 while lighting control application 921 is running on computer 920. In one example, the sound effects may be associated with the lighting effects themselves and include thunder, rain, crashing waves, underwater sounds, etc. In another example, a user may select sound effects or music to create a particular ambience in the room of the vivarium.

In another embodiment, lighting control application 921 may be used to create one or more unique lighting profiles corresponding to one or more controller lighting effect configurations. These profiles may be stored in storage 923 and accessed by a user of computer 920 to change the lighting control settings of a corresponding controller 910. In implementations of these embodiments, computer 920 may poll the lighting controller 910 for its current lighting profile prior to implementing any changes. In additional implementations of these embodiments, each lighting profile may include audio information that specifies audio that is synchronously played back with the lighting effects associated with the lighting profile.

In yet further embodiments, lighting control application 921 may provide a software module for grouping a plurality of controllers 910 that are connected together, are in the same area (e.g., the same room), or both. For example, the software module may allow a user to group a plurality of connected controllers, label the group, and otherwise cause computer 920 to receive or send information to each of the controllers comprising the group. In this way, computer 920 may simultaneously deliver lighting control information to all of the lighting controllers 910 that are grouped together. Alternatively, computer 920 may deliver lighting control information only to one or some of the members of the group. In implementations of these embodiments, a group of lighting controllers 910 may include one or more unique lighting profiles corresponding to each lighting controller, a group lighting profile corresponding to the group of lighting controllers, or some combination thereof. In further implementations, multiple groups may be created, labeled, and controlled using lighting control application 921.

In yet another embodiment, controller 910 may connect to the Internet and receive/upload lighting control information over a web browser and/or email. For example, a lighting control profile corresponding to the controller 910 may be stored on a file server and accessed via a web server. In implementations of this embodiment, a computer 920 (e.g., a smartphone or tablet) may remotely receive or send lighting control information associated with controller 910 by accessing the web server.

The lighting control systems described herein can also be used to control numerous devices other than lighting fixtures to emphasize artful aquascaping/terrascaping, optimize the living environment for the vivarium inhabitants, and mimic naturally occurring scenes, events, and cycles. The following provides exemplary and non-limiting embodiments of habitat systems that can be controlled via one or more lighting control systems. Any of the embodiments disclosed above can be coupled to additional non-lighting devices (e.g., habitat equipment and sensors, referred to collectively as "accessories" or individually as an "accessory" or "habitat component") via one or more lighting control systems. Moreover, a lighting control system as described above does not have to be used for lighting. Instead, it can serve as a manifold, i.e., hub for non-lighting devices. For example, a lighting control system can be dedicated to the control of water pumps. Depending on the inhabitants of the habitat, different lighting fixtures and accessories, or combinations of lighting fixtures and accessories, will be appropriate.

In an embodiment of the invention, a habitat component has an integrated circuit and memory that comprises a unique identifier and optional operating data. The unique identifier allows a controller or manifold to recognize and identify the habitat component and operate the habitat component according to the operating data stored in the memory (or alternatively, operate the habitat component according to operating data stored within or downloaded to the controller or manifold from a remote source).

Figure 10:
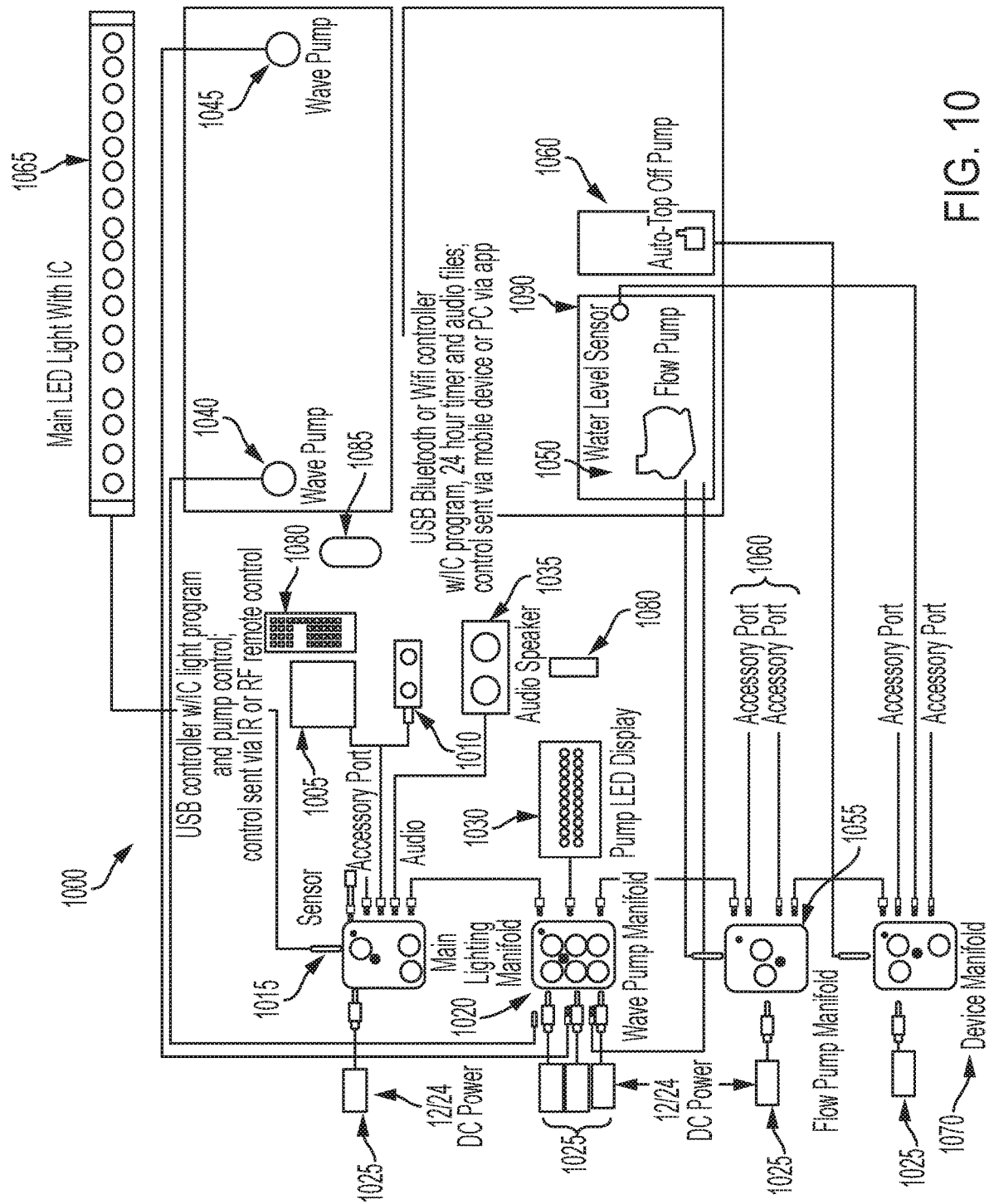
FIG. 10 illustrates a marine aquarium system according to an exemplary embodiment of the invention.

FIG. 10 illustrates a marine aquarium system 1000 according to an exemplary embodiment of the invention. Here, the marine aquarium system 1000 provides exemplary components for use in a saltwater reef aquarium system. As shown, the marine aquarium system 1000 comprises a main light IC controller 1005 comprising a processor and programming for various habitat components such as lighting fixtures and accessories. The controller 1005 may be programmed via a push button keypad or infrared (IR) or radio frequency (RF) remote controller 1080 (or via a user system 103). The controller 1005 plugs into a main lighting IC manifold 1015, main pump manifold 1020 flow pump manifold 1055, and device manifold 1075 via, for example, a universal serial bus (USB), microUSB, or other connector, the identification and implementation of which is apparent to one of ordinary skill in the art. Alternatively, the controller 1005 can be programmed via operating data obtained from memory in an accessory, i.e., habitat component. The operating data may include programming not only for the habitat component from which it came from, but for other habitat components implemented in the marine aquarium system.

In an embodiment of the invention, the controller 1005 provides a twenty-four (24) hour light timer or clock to simulate sunrise, daylight, sunset, and moonlighting. Additionally, the controller 1005 facilitates additional modes for color spectrum control and weather simulation including, but not limited to rolling cloud cover, random cloud cover, and thunderstorms with lighting. Daily weather patterns can also be programmed. The controller 1005 further provides pump programs for wave, surge simulation, flow/speed control, and a fish feeding mode (where the pumps shut down or decrease in flow during a feeding).

Alternatively to or m combination with the controller 1005, a wireless IC controller 1010 is coupled to the main light IC manifold 1015. The wireless IC controller 1010 comprises programming for the lighting fixtures and accessories. The controller 1010 communicates via a user system 103 and can also update other components within the system. Communication is implemented via, for example, Bluetooth or Wi-Fi. Controller 1010 plugs into the main lighting IC manifold 1015, main pump manifold 1020, flow pump manifold 1055, or device manifold 1075 via USB, MicroUSB, or other connector.

The main light IC manifold (i.e., a lighting control system) 1015 receives communications via controllers 1005 and/or 1010 and communicates information to/from other manifolds 1020, 1055, and/or 1075. Manifold 1015 can be coupled to other manifolds via wires or wireless communication channels. The manifold 1015 is coupled to main light 1065 (e.g., LED strip 507), DC power supply 1025, accessories 1060, and other DC powered LED lights. An optional LED indicator light shows communication status.

The main pump manifold 1020 is a modular manifold that receives communications via controllers 1005 or 1010, and communicates information to/from other manifolds 1015, 1055, and 1075. The main pump manifold 1020 is coupled to main light 1065, DC power supply 1025, accessories 1060, and pump LED display 1030. The manifold 1020 comprises three (3) or more ports for powering wave/propeller pumps, water pumps or air pumps. An optional LED indicator is provided to show communication status. The main pump manifold 1020 facilitates various pump modes including water surge simulation, wave/pulse simulation, and strong ocean currents. A master/slave mode allows wave pumps 1040 and 1045 to work in tandem to create Gyre flow.

For example, a direct current (DC) water pump utilizing a rotating propeller magnetically driven by a DC motor that is submersed underwater and produces water flow in the aquatic habitat. The pump can be programmed and controlled via the controller (or an app) with the following modes of water flow: stream—provides a constant, steady flow of water at set flow from 0 to 100%; surge—simulates surging water flow and is adjustable via both flow rate from 0 to 100% and frequency of surges (pump ramps up and down over a pre-programmed frequency); and wave—simulates waves by pulsing the pump in short frequencies adjusting flow rate from 0 to 100% and frequency of pulses (e.g., sinusoidal wave as a function of time)(or pump turns on and off in a short, pulsing manner).

A mister (not shown) can be implemented in combination with the water pump to simulate cloud cover. For example, the mister can be programmed and controlled via the controller (or app) with the following modes of misting: constant—mister is turned on; ramp-mister is slowly intensified over time; or intermittent.

DC power supply 1025 comprises a AC/DC transformer for converting a conventional alternating current source to low, voltage direct current. Alternatively, the DC power supply 1025 may comprise a DC/DC transformer, DC battery/back up system, solar power source, or other alternative power source, the identification and implementation of which is apparent to one of ordinary skill in the art.

The system 1000 may further comprise a pump LED display 1030 to indicate the coupling of wave pumps 1040 and 1045, flow pumps 1050, or other pumps to main pump manifold 1020. Controller 1080 allows main pump manifold 1020 to be operated on its own as a stand-alone pump controller.

Audio speaker 1035 permits audio programs, sound effects, and/or music to be played. The audio speaker 1035 can be coupled to any manifold 1020, 1055, or 1075.

Wave/propeller pump 1040 and 1045 simulate ocean currents, waves/pulsing and water surging. The wave/propeller pumps 1040 and 1045 work in tandem with lighting programs, a fish feeder, and other accessories. In an embodiment of the invention, the wave/propeller pump 1040 or 1045 can be designated as a master or slave pump, allowing it to work in tandem with the other pump 1045 or 1040, respectively, for Gyre flow.

Wave/propeller/flow pump 1050 is provided to simulate ocean currents, waves/pulsing and water surging for filter recirculation, water circulation, or power filtration devices such as protein skimmers.

Flow pump manifold 1055 is designed for water recirculation pumps, which provide a constant, consistent flow. The flow pump manifold 1055 can be used in conjunction with either main light IC controller 1005 or pump LED display 1030 and allows the coupled water pump to have flow adjusted or be put on a timing schedule.

The system 1000 may further comprise various accessories 1060 coupled to the flow pump manifold 1055. For example, accessories 1060 include, but are not limited to under cabinet LED lighting, a ventilation cooling fan, refugium light, submersible filter, submersible flow pump, underwater LED lights, color accent lights, spotlights, auto top off systems, temperature gauge, fish feeder, and aquarium ornaments. An accessory 1060 are coupled to the flow pump manifold 1055 (or any other manifold) via an accessory port.

Device manifold 1070 controls devices such as LED lights, water pumps, air pumps, water misters, heaters, heat lamps, cooling fans, and foggers. The device manifold 1070 comprises programming for receiving data from device sensors 1090 and communicating information to other components of the system 1070.

System 1070 can be connected to a user system 1085 (e.g., user system 103) as described above. The user system 1085 can communicate with any manifold via wireless controller 1010. The user system 1085 can also be synchronized with the system 1000 for paying audio programs, and receiving alerts of device sensor 1080 status via text, phone, or alarm. Device sensors 1080 include, but are not limited to temperature sensors, humidity sensors, hygrometer, total dissolved solids (TDS) meters, salinity meters, water level indicators, and water sensors.

In an embodiment of the invention, the system 1000 may implement one or more scenes or functions, which can be selected on-demand or programmed to run during certain times during the day.

For example, the system 1000 may implement a storm with lighting. When a user selects this effect, the following functions are performed to create the overall visual appearance of a lightning storm. Lighting fixture 1065 dims, white IC LEDs flash in random to simulate lightning strikes. The lightning strikes are in random or programmed locations (not all of the LEDs flash, only select LEDs). Lights can also be programmed to simulate the distance of the storm. Wave pumps 1040 and 1045 slowly ramp into a pulsing mode, simulating crashing waves found during a storm. The wave/pulsing action also creates additional surface movement, enhancing the shimmer effects. Pump effects can also be programmed to simulate the distance of the storm. Audio output from speaker 1035 matches the storm. When lightning strikes, thunder audio is played to match. Audio can be programmed for delay to simulate distance of storm.

In another effect, a full Storm with lightning is implemented. When a user selects this effect, the following functions are performed to create the overall visual appearance of a full rain/thunderstorm storm. Lighting fixture 1065 dims, white IC LEDs flash in random to simulate lightning strikes. The lightning strikes are in random or programmed locations (not all of the LEDs flash, only select LEDs). Lights can also be programmed to simulate the distance of the storm. White IC LEDs of lighting fixture 1065 can also be programmed on a preset schedule to simulate rolling clouds across the aquarium. Wave pumps 1040 and 1045 slowly ramp into a pulsing mode, simulating crashing waves found during a storm. The wave/pulsing action also creates additional surface movement, enhancing the shimmer effects. Pump effects can also be programmed to simulate the distance of the storm. Audio output at speaker 1035 matches the storm. When lightning strikes, thunder audio is played to match. Additional rain and wind can be heard to match. Audio can be programmed for delay to simulate distance of storm.

A feed mode can also be implemented. Here, lighting fixture 1065 ramps into a preselected color spectrum or light pattern to aid/indicate to fish feeding time is about to happen. This can also help with smaller fish fry, shy fish, acclimating fish in helping them with better feeding patterns. Wave pumps 1040 and 1045 ramp down to an idle speed over a preprogrammed time. This allows food to stay within the water column for a longer period of time while also ensuring food does not get damaged flowing through the pump propellers. Main flow pump 1050 may ramp down to an idle speed, allowing food not to enter the filter of the aquarium tank and allowing fish to feed. Pump 1050 can then be ramped back up to filter uneaten fish food out of water column. If a fish feeder is present, the feeder can be automatically triggered to feed the fish. In an embodiment of the invention, the fish feeder comprises operating data that is transmitted to the controller to program the various wave pumps according to the feed mode.

An automatic temperature control mode may also be implemented. Here, water temperature is monitored via the device manifold 1070 using thermometer 1075. When an excessive temperature is reached (too hot), devices can be programmed to perform functions, including: light fixture 1065 ramping down in brightness to not transfer as much heat; wave pumps 1040 and 1045 ramping down in flow to not produce as much heat; flow pump 1050 ramping down in flow to not transfer as much heat; and cooling fans may turn on to blow cool air over sump, aquarium or light fixture 1065.

The system 1000 may further implement a cleaning mode. Here, lights can be ramped to a preselected color spectrum which aids the user in visually showing where algae, detritus, and dirt is located on the glass aquarium wall for cleaning, or in the tank for siphon removal. Wave pumps 1040 and 1045 can be ramped into a wave action/pulsing mode to suspend dirt particles and detritus in the water, then ramp into a flow mode to push/pull the dirt and detritus into the filter boxes. This mode may repeat itself numerous times over a time period for cleaning.

Figure 11A:
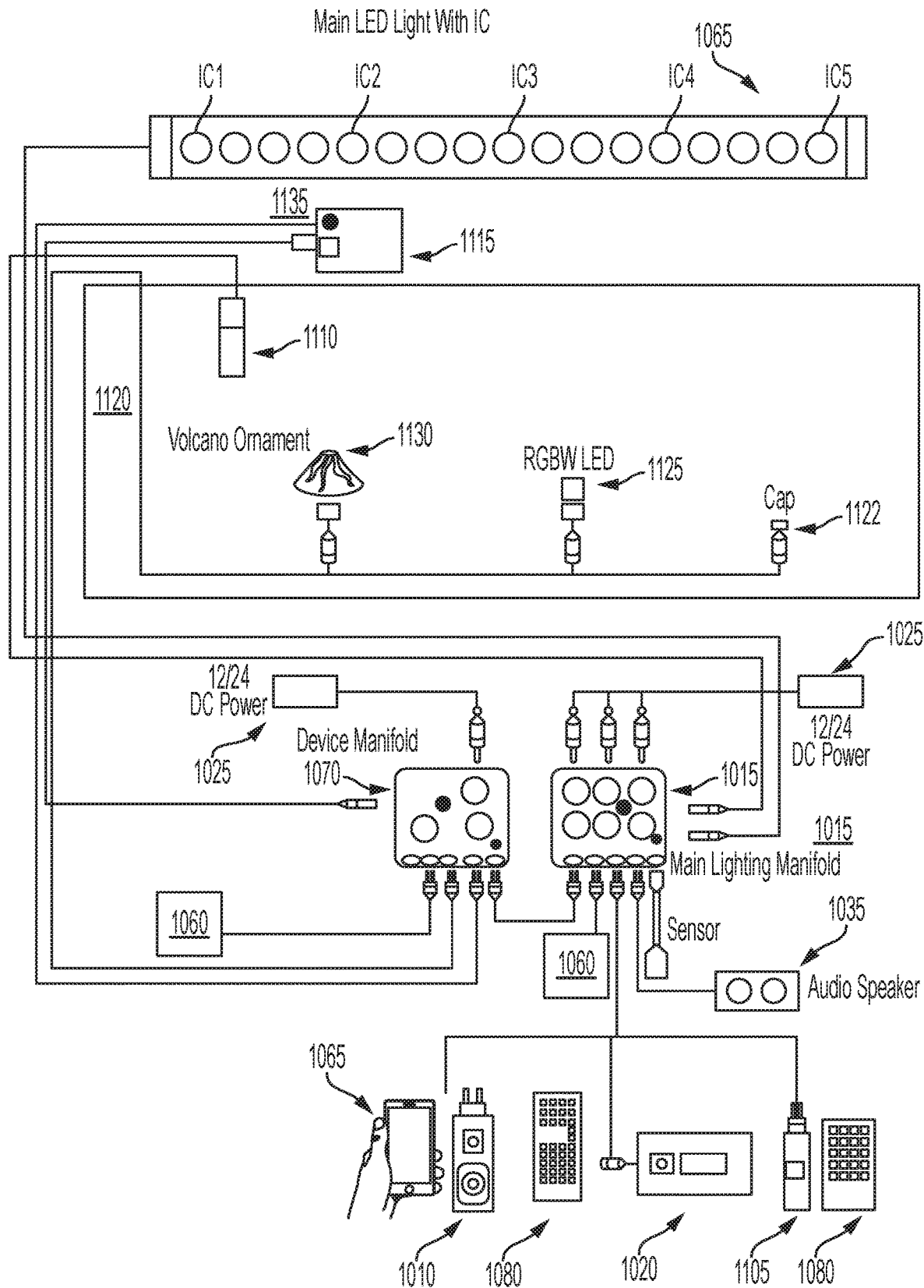
FIG. 11A illustrates a freshwater aquarium system according to an exemplary embodiment of the invention.

FIG. 11A illustrates a freshwater aquarium system 1100 according to an exemplary embodiment of the invention. Here, the freshwater aquarium system 1100 provides exemplary components for use in a freshwater aquarium system. As shown, the freshwater aquarium system 1100 comprises many of the components of the saltwater aquarium system 1000 including the main light IC controller 1005, the controller 1005, the wireless controller 1010, the main lighting manifold 1015, the DC power source 1025, the audio speaker 1035, one or more accessories 1060, the light fixture 1065, the device manifold 1070, remote controllers 1080, and user system 1085.

An optional USB controller 1105 can be provided for controlling light fixture 1065, audio speaker 1035, accessories 1060, and submersible pump/filter 1110. The controller 1105 can be programmed via the remote controller 1080. The controller 1105 plugs into the main lighting IC manifold 1015 or device manifold 1070 via USB, microUSB, or other type of connection. The programming allows for color spectrum control and weather simulation including rolling cloud cover, random cloud cover, and thunderstorms with lighting. Daily weather patterns can be programmed as well. The submersible pump/filter 1110 can be controlled to create currents and surface action. The filter 1110 may comprise a filter module to provide chemical, biological and mechanical filtering.

The system 1100 further comprises an aquarium power filter 1115 with a removable filter cartridge and DC controllable pump. The DC controllable pump allows for water flow control and temporary suspension during feed mode.

Various components can be connected via a cable/wire 1120 that provides power and bilateral data communications. The cable 1120 is waterproof and submersible and can include multiple plugs to connect to components with processors. Cable/wire 1120 can be used to connect components in any of the embodiments described herein. The cable/wire 1120 can include a cap 1122 which screws onto a port on the IC cable 1120 for protection.

In an exemplary embodiment of the invention, the system 1100 further comprises a submersible RGBW LED light with IC 1125 and ornament with IC 1125. The RGBW LED light 1125 comprises an adjustable lens an IC with program instructions. Individual red, green, blue, and white LEDs are included and can be individually controlled or fade. The ornament 1125 is a molded aquarium ornament comprising an IC with program instructions and LEDs which can be controlled to simulate color. In an embodiment of the invention, the ornament 1125 is a volcano and the LEDs simulate a volcano eruption. The ornament includes operating data that can be used to control other habitat components in the system. For example, as part of the volcano eruption, the lights 1125 may change colors and other ornaments can flash.

A water level sensor 1135 is provided to indicate water level in the filter 1115. For example, the water level sensor 1135 (such as an optical sensor or water level switch) is mounted in the 115 detects a water level above a predetermined threshold created by filter clogging. As the filter pad, bag, or media becomes dirty/clogged with dirt, debris or detritus, the water level will rise in the filter. When the water level sensor 1135 identifies a water level above a predetermined threshold, the sensor 1135 will send a signal to the device manifold and/or an alert/text the user. Optionally, a visual alarm via an indicator light on the filter 1115 illuminates indicating the filter needs cleaning or the filter pad, bag, or media needs to be replaced. The app may also direct the consumer to purchase/order a replacement filter pad, bag or media.

Figure 11B:
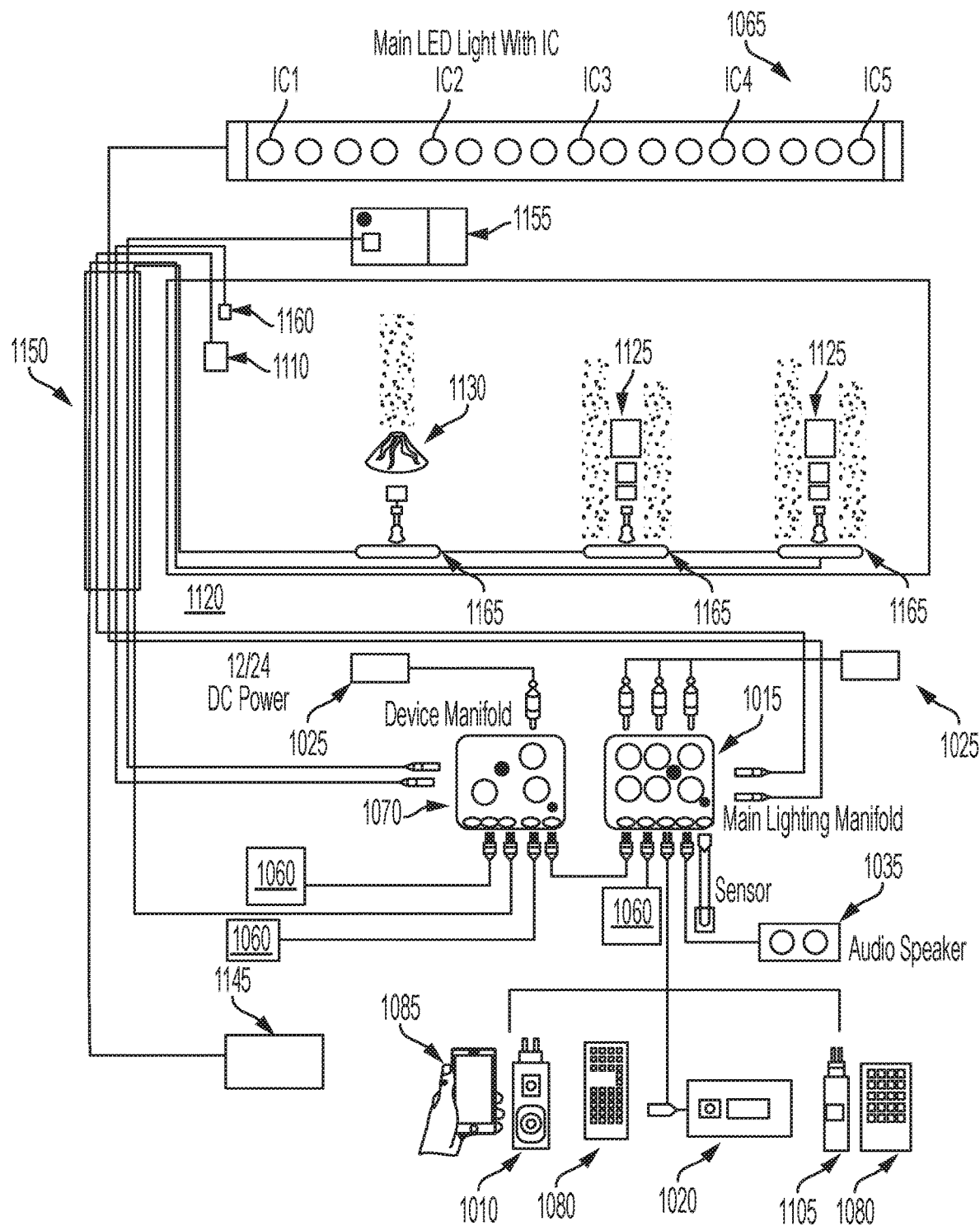
FIG. 11B illustrates additional exemplary components of the system of FIG. 11A.

FIG. 11B illustrates additional exemplary components of the system 1100. For example, an air pump 1145 provides air, oxygen, water movement, circulation into the aquarium via airline tubing and air stones, pumps, or ornaments. Optionally, the system 1100 comprises an airline/cable assembly 1150 comprising a molded silicone jacket which allows a user to attach multiple cables and airlines together, creating a single clean cable. A fish feeder 1155 is further provided and can be controlled via a remote 1080. A mister/fogger 1160 is provided that ultrasonically mists freshwater simulating cloud cover, watering plants. The mister/fogger 1160 work in conjunction with water pump 1180 to simulate rolling clouds over the water surface. One or more airstone/air diffusers 1165 diffuse air and oxygen into the water and create underwater effects in tandem with lighting schemes. The airstones 1165 are linkable and attached to one another (and to the air pump 1145) via an air hose.

In an embodiment of the invention, the system 1100 may implement one or more scenes or functions, which can be selected on-demand or programmed to run during certain times during the day. For example, the system 1100 may implement a lightning/thunder storm. Here, when user selects this effect, the following functions are performed to create the overall visual appearance of a lightning storm. Lighting fixture 1065 dims, white IC LEDs flash in random to simulate lightning strikes. The lightning strikes are in random or programmed locations (not all of the LEDs flash, only select LEDs). Lights can also be programmed to simulate the distance of the storm. Submersible pumps 1110 with nozzles may slowly ramp into a pulsing mode, simulating crashing waves found during a storm. The wave/pulsing action also creates additional surface movement, enhancing the shimmer effects. Pump effects can also be programmed to simulate the distance of the storm. Audio output at the speaker 1035 matches the storm. When lightning strikes, thunder audio is played to match. Audio can be programmed for delay to simulate distance of storm. Other pumps in the system 1110 (canister filter pump 1110, air pumps 1145, etc. . . . ) may alternate flow to create additional surface action. Underwater LED lights 1125 may blink, flash, fade in conjunction with main light to augment storm lighting effects.

In another embodiment of the invention, a sunrise/daylight/sunset scene is implemented. For example, main LED light 1065 slowly ramps from no/minimal intensity to a brighter color spectrum to simulate a natural sunrise. Bright daylight color spectrum runs during the day. Ramps then slowly fade/dim to a lower color spectrum to simulate sunset. Blue or white lights may fade/lower in intensity to simulate moon lighting. Audio may play at speaker 1035 flowing water slowly increases in volume. In the evening, audio may switch to animals which can be heard at sunset (i.e., frogs chirping). Pumps 1110 and 1145 may ramp for a lower night intensity to a stronger flow rate/current. Background light may slowly ramp in brightness or color spectrum to simulate a natural sunrise or dim to a sunset color spectrum. Water temperature may fluctuate to simulate water heating up during the day/cooling off at night.

In another effect, a rain storm (with no lightning) is provided. Here, IC LEDs 1065 gradually increase/decrease in brightness in random or sequential order to simulate moving clouds. The water mister 1160 may operate at full power to simulate heavy cloud cover. Audio matches to play rain at speaker 1035. The submersible pump 1110 connected to a conduit of pipe with holes over the tank may turn on to simulate rain.

In yet another effect, rolling clouds are provided. Here, IC LEDs 1065 gradually increase/decrease in brightness in sequential order to simulate moving clouds. The water mister 1160 may operate at full power or pulsate to create mist/clouds. The submersible pump or wave pump 1110 may pulsate in conjunction with the mister to push the mist across the aquarium water surface. Audio may play wind at speaker 1035. A rotating fan (not shown) may also be used to push mist across the surface of the tank.

The system 1100 may also implement a feed mode. For example, lighting fixture 1065 ramps into a preselected color spectrum or light pattern to aid/indicate to fish feeding time is about to happen. This can also help with smaller fish fry, shy fish, acclimating fish in helping them with better feeding patterns. Optional aquarium ornaments or underwater lights may also flash or change spectrum as an indicator to fish of feeding time. Submersible pumps 1110 or any filter pumps (canister filter, power filter, etc. . . . ) ramp down to an idle speed over a preprogrammed time. This allows food to stay within the water column for a longer period of time while also ensuring food does not get damaged flowing through the pump propellers. Pumps then go back into normal operation, cleaning the tank. If a fish feeder 1155 is present, the feeder can be automatically triggered to feed the fish.

A geological event, such as a volcano eruption, can be simulated by the system 1100. Here, the main light 1065 may dim to a preselected color spectrum or IC chips may activate to simulate rolling or random clouds. Speaker 1035 outputs sounds of a rumbling, volcano. The IC controlled volcano ornament 1130 changes color, flashes, simulating an eruption. Air pump 1145 may ramp up/alternate or turn on/off simulating ash/accenting lights and water movement, and forces air to pass through airstones 1165. IC lights within the volcano may change color or dim/change intensity to visual look like flowing lava.

In an embodiment of the invention, one or more habitat components such as ornaments are coupled to a molded cable with airline with molded connection track. Most freshwater aquariums have one, or a multitude of air hoses leading to air stones or ornaments at the bottom of the aquarium. Too many hoses and cables get quite messy, so combining them into one or allowing them to be attached to each other is favorable.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

We claim:

1. A system for controlling and recognizing habitat components comprising:
    a main controller comprising a processor configured to execute program instructions, memory for storing a first set of program instructions as well as information associated with a set of habitat components;
    a first manifold comprising a plurality of ports, wherein a first one of the plurality of ports is in communication with a first habitat component from the set of habitat components, and a second one of the plurality of ports in communication with the main controller; and
    a second manifold in communication with the main controller via the first manifold, wherein the second manifold comprises a plurality of ports, wherein one of the plurality of ports is in communication with a second habitat component from the set of habitat components;
    wherein upon connecting the first habitat component to the first manifold, the processor of the main controller is configured to recognize an identity of the first habitat component according to the information associated with the set of habitat components, and execute one or more program instructions from the first set of program instructions to control operation of the first habit component; and
    wherein upon connecting the second habitat component to the second manifold, the processor of the main controller is configured to recognize an identity of the second habitat component according to the information associated with the set of habitat components, and execute one or more program instructions from the first set of program instructions to control an operation of the second habitat component.

2. The system of claim 1, wherein the first manifold is a lighting manifold and the first habitat component is an LED light.

3. The system of claim 1, wherein the second manifold is a pump manifold and the second habitat component is a pump.

4. The system of claim 1, wherein the second manifold is a device manifold and the second habitat component is a sensor.

5. The system of claim 1, wherein the main controller further comprises a communications modules for receiving communications from a remote controller or user device, the communications comprising the first set of program instructions or a second set of program instructions, and the processor is configured to execute the second set of program instructions to jointly control both the first habitat component and the second habitat component.

6. The system of claim 1, wherein the main controller comprises a user interface and display.

7. The system of claim 1, wherein the user device is a smartphone, tablet, or personal computer.

8. The system of claim 1, wherein one of the plurality of ports in the first manifold of the second manifold is electronically coupled to a display, an audio speaker, or a communications module.

9. The system of claim 1, wherein the second habitat component is selected from the group consisting of: an ornament, fish feeder, light, heater, chiller, water pump, air pump, wave maker, mister, fogger, thermometer, water monitor, air monitor, filter sensor, and water level sensor.

10. The system of claim 1, wherein the first habitat component is a pump and the second habitat component is a feeder; wherein the one or more program instructions from the first set of program instructions further comprises a feeding instruction and upon execution of the feeding instruction, the pump is deactivated and the feeder is activated.

* * * * *